United States Patent [19]

Dyer et al.

[11] Patent Number: 5,754,849

[45] Date of Patent: May 19, 1998

[54] SELF-DESCRIBING OBJECT PROVIDING DYNAMIC MANIPULATION OF HETEROGENEOUS DATA VALUES AND SEMANTIC IDENTITY BETWEEN MEMORY AND TRANSMISSION REPRESENTATIONS

[75] Inventors: Landon M. Dyer, Campbell, Calif.; Robert V. Welland, Seattle, Wash.

[73] Assignee: Wayfarer Communications, Inc., Mountain View, Calif.

[21] Appl. No.: 593,968

[22] Filed: Jan. 30, 1996

[51] Int. Cl.$^6$ .................................................. G06F 17/30
[52] U.S. Cl. .................. 395/612; 395/613; 395/497.01; 395/497.02
[58] Field of Search ........................... 395/612, 613, 395/497.01, 425, 497.02; 360/48; 365/230; 235/492; 364/200, 900

[56] References Cited

U.S. PATENT DOCUMENTS

| | | | |
|---|---|---|---|
| 4,575,827 | 3/1986 | Kulakowski | 365/230 |
| 4,893,232 | 1/1990 | Shimaoka et al. | 364/200 |
| 5,034,914 | 7/1991 | Osterlund | 364/900 |
| 5,129,076 | 7/1992 | Freeman et al. | 395/425 |
| 5,129,084 | 7/1992 | Kelly, Jr. et al. | 395/650 |
| 5,165,023 | 11/1992 | Gifford | 395/325 |
| 5,212,786 | 5/1993 | Sathi | 395/612 |
| 5,247,646 | 9/1993 | Osterlund et al. | 395/425 |
| 5,261,080 | 11/1993 | Khoyi et al. | 395/500 |
| 5,338,923 | 8/1994 | Grieu | 235/492 |
| 5,421,012 | 5/1995 | Khoyi et al. | 395/650 |
| 5,426,747 | 6/1995 | Weinred et al. | 395/400 |
| 5,432,928 | 7/1995 | Sherman | 395/600 |
| 5,442,771 | 8/1995 | Fillep et al. | 395/650 |
| 5,479,656 | 12/1995 | Rawlings, III | 395/497.02 |
| 5,488,717 | 1/1996 | Gibson et al. | 395/612 |
| 5,551,020 | 8/1996 | Flax et al. | 395/613 |
| 5,561,785 | 10/1996 | Blandy et al. | 395/497.01 |
| 5,592,342 | 1/1997 | Hall et al. | 360/48 |

*Primary Examiner*—Thomas G. Black
*Assistant Examiner*—Frantz Coby
*Attorney, Agent, or Firm*—Fenwick & West LLP

[57] ABSTRACT

An object for use in a computer memory and for transmission between computers flexibly stores a large variety of different types of data, in such a manner as to allow easy and efficient transfer and copying of the data between computers. The object includes any number of data elements, each of which is self-describing using type coding. Certain data elements may include other data elements, thereby providing for arbitrarily complex hierarchical arrangements of data in memory. The type codes may be based on the frequency of the types or values of data operated upon, such that the data itself may be used as a type code for at least one type of data, thereby reducing the memory and bandwidth requirements for handling the object. The object is capable of creating a data stream output for copying and transmission that preserves the semantic structure of the object, particularly its hierarchical organization, and is further capable of reconstituting the hierarchical arrangements. Because of the self describing nature of the object and its data elements, marshalling is not needed for inter-computer transfers of the object.

13 Claims, 8 Drawing Sheets

SELF-DESCRIBING OBJECT PROVIDING DYNAMIC MANIPULATION OF HETEROGENEOUS DATA VALUES AND SEMANTIC IDENTITY BETWEEN MEMORY AND TRANSMISSION REPRESENTATIONS

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND

1. Field of Invention

The present invention relates to data storage arrangements generally, and more particularly, to data storage arrangements useful in application development environments for representing heterogeneous data types in a uniform manner for simplified transfer of data between client and server computers.

2. Background of Invention

Client-server computing has become the predominant model of distributed computing, paralleling the increasing performance of desktop computers and workstations. In a client-server distributed computing environment, multiple computers are connected in a network, and a computer may operate both as client, a consumer of resources and data, and a server, a producer of resources and data for the clients.

In any client-server environment, a client requests operations of a server through a remote procedure call (RPC). In a remote procedure call, a process on a local computer, the client, invokes a process, the server, on a remote computer. Typically, the client transfers data to, or requests and receives data from, the server. In order for both computers to operate on a set of transferred data, there must be an agreed upon set of semantics between the client and the server for defining the arguments passed across the call. This is because both the client and the server may have different internal architectures for representing data, and thus, explicit specification of types of arguments is used to communicate data between the client and server.

For example, if the client requests a procedure from a server that supplies a graphics file from the server, the client may expect that the resulting data be constructed a [file name, file type, creation date, data bytes]. The server must have information that defines the data being sent as the same, in the same order so that the client can properly receive and process the data. The determination of the types of data used in a given remote procedure call between a client and a server is determined at the time the client and server applications are written and compiled into executable code.

In order to ensure that both the client and server have the same semantics for a call, the executable code of the sending computer receives the data from the memory, and formats the data being into a standard, network representation. The computer receiving this data then reconstructs this representation to reproduce the original data, which may then be stored in the receiving computer's local memory and acted upon. In most computer systems, the data is stored in memory using implicit typing. That is, the type of the data is not stored directly with the data itself. Instead, the computer program, typically in the procedural module and header files, holds the type information about the nature of each piece of data it receives. This is done in order to save storage space: if every piece of data contained explicit type information, the overall amount of data that could be stored in a given memory would be significantly reduced. Thus, implicit typing is used to maximize local memory capacity.

The conversion and construction of data from its memory representation in a computer memory to its transmission representation on a transmission medium is called marshalling. In a general purpose RPC mechanism explicit typing of the transmission representation is used, since the memory representation used by client and server computers with different memory architectures typically does not allow the memory representation used by one computer to be directly used with the second computer. Thus, the data must be marshalled from its implicit memory representation to an agreed explicit transmission representation. However, marshalling routines are specific to each RPC mechanism, since they designed to construct the data for a particular and machine architecture RPC mechanism. Thus, because of the differences in memory and transmissions representations, computer systems that use different RPC mechanisms, are unable to communicate and freely exchange data in a client-server relationship.

In a conventional system then, once the client and server applications have been compiled, the format of the data being transmitted between for a given procedure call is fixed. The server cannot arbitrarily change the format of the data. Using the previous example, the server could not arbitrarily send back to the client the graphics file as [creation date, file permissions, file type, data bytes, file name], or some other arrangement that is unanticipated by the client. This is because both the client and server have been compiled with specifically linked in marshalling routines. To change the data format requires recompiling, and thereby distributing to the end users or system administrators, new versions of the client and server. Any attempt to arbitrarily change one side of the transaction will cause the other side to at best ignore the data, likely misinterpret it, or worst, crash.

Accordingly, it is desirable to provide a data storage format that preserves the semantic structure of the data between its memory representation in a computer memory and its transmission representation in a transmission medium, in order to eliminate the need to marshall data for communication between clients and servers.

In most application development environments, including object-oriented environments such as Microsoft's Visual Basic or Visual C++ development environments, applications programmers are provided with a rich set of predefined program components, such as objects, modules, and the like, to be used for constructing end user applications, including client-server applications like those described above.

In conventional object oriented systems, the provided objects typically include a number of objects for handling different types of data formats. For example, in Visual Basic, there are provided different objects that separately handle strings, arrays, and so forth, each object having methods particular to the manipulation of one type of data. It would be desirable to provide in an application development environment a single object that flexibly handles a variety of different data types, and allows that object to be easily transported from one computer memory to another without the need for the applications programmer to write the marshalling routines conventionally required, as described.

Finally, in conventional application development environments, data in an object, once instantiated as a particular type, cannot be easily changed to being data of a different type. Typically, there are separate classes for handling significant types of data, such as strings, arrays, maps, and the like. Once a data value is created in an object of one type, it cannot be immediately converted to object of another type. While casting of data types is known, casting does not permanently alter the type definition of a data element: The ability to dynamically manipulate and redefine the types of any data element in a data arrangement is thus desirable to increase the programmer's flexibility in handling the data elements.

SUMMARY OF THE INVENTION

In accordance with one aspect of the present invention, there is provided for an application development environment an object that is capable of storing a large variety of different types of data in a manner that allows simplified transmission of the internal data of the object from a first computer to a second computer over a transmission medium in a communications network. The object internally represents each data element using explicit typing, and arranges the data in a manner that allows it to be read from its memory representation in the first computer into a data stream transmission representation for communication to a second computer, where the object is reconstructed to the equivalent memory representation. The transmission representation in a transmission medium, while semantically identical to the memory representation of the object, is location independent, and thereby may be transported directly between computers, and then reconstituted into another instance of the object. In this manner the object is self describing of the semantic structure of its data, regardless of whether the object is stored in memory or being transmitted.

The present invention allows the applications programmer to transmit complex data arrangements between computers on a network without having to write marshalling code in a first computer that converts the data arrangement of the object in the first computer into a format capable of transmission to a second computer, or the marshalling code in the second computer that reconverts the transmitted data to its original form. This enables programmers to more easily create and maintain client-server applications.

In one embodiment of the present invention, the object, usefully called a "value object," stores in each instance of a data element a type code that defines a type of data, and the data itself. In a preferred embodiment, the types of data supported include scalar types with fixed sizes, blobs, which are variably sized data elements that do not contain other data elements, and aggregations, which are variably size data elements that may include other data elements, either of the same type or heterogeneous types. The value object includes methods to get, set, add, remove, modify, test, and copy particular instances of data or sets of data. As a further aspect of the present invention, any instance of a data element with a particular type may be dynamically redefined as being an instance of another type of data. The value object further includes methods that "flatten" and "unflatten" the data of the value object, that is, convert it from its memory representation in a computer memory to its transmission representation in a transmission medium, and back.

In accordance with another aspect of the present invention, there is provided a method of transmitting data from a first computer to a second computer on a communications network using a data arrangement that is semantically self describing, thereby allowing the data to be transferred without conventional marshalling operations that convert the data from the memory representation in the first computer to an intermediate transmission representation and then to the memory representation in the second computer.

DETAILED DESCRIPTION OF THE INVENTION

Figure 1:
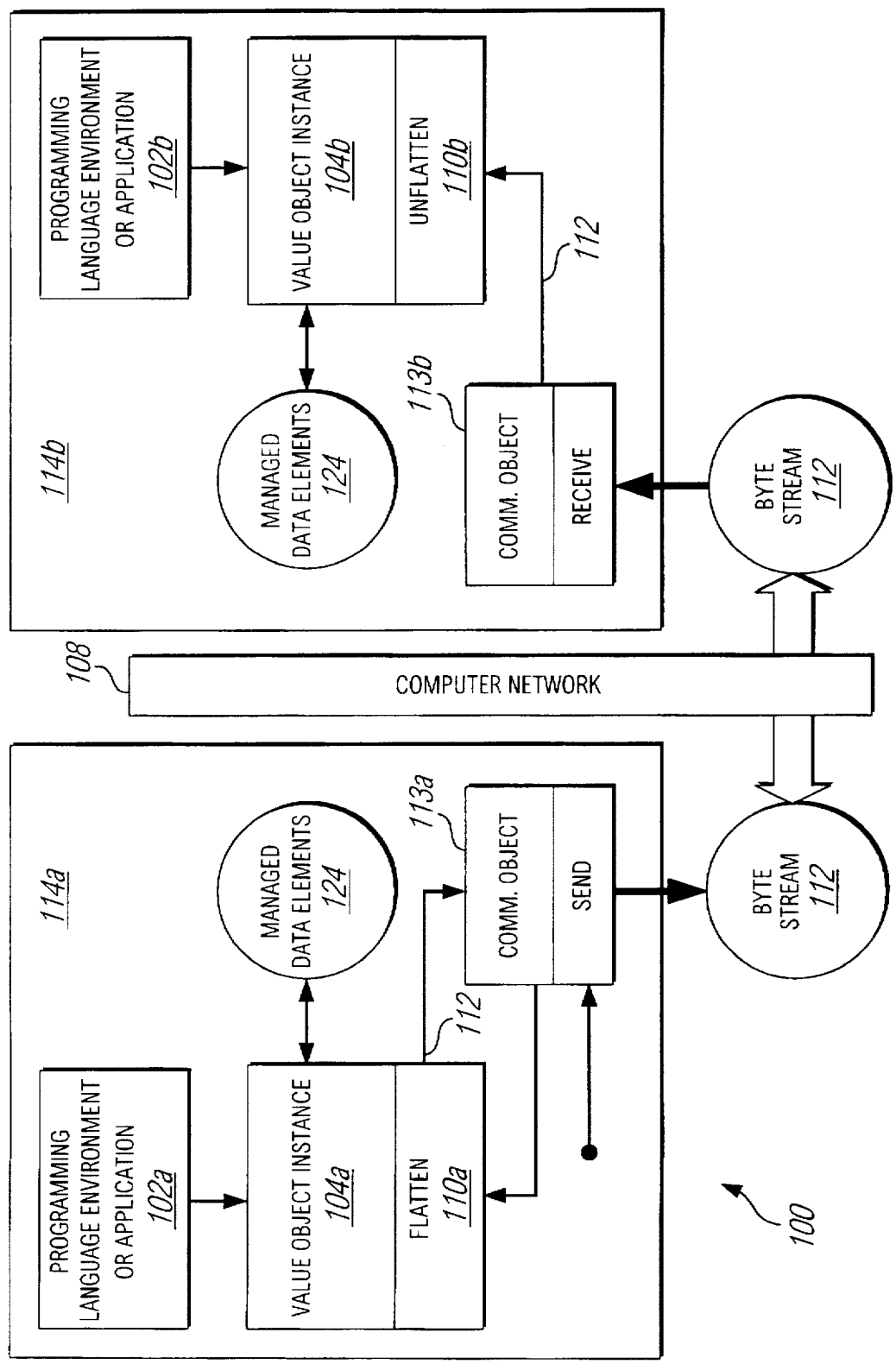
FIG. 1 is an illustration the data flow in a system for transmitting a data arrangement between a first and second computer in accordance with the present invention.

Referring now to FIG. 1, there is shown a schematic representation of a computer system 100 for transferring data between the memories 114 of two computers across transmission medium in a network 108. In a first computer memory 114a, a first application 102a or programming language environment constructs an instance of a value object 104 from an available class definition (unless otherwise noted, references to an instance of a class, and to the class itself will be made using the same reference number.) The application 102 initializes the value object 104a with some set of data elements 124. While illustrated outside of the value object 104a, the managed data elements 124 are stored "inside" or with the instance of the object.

Figure 2:
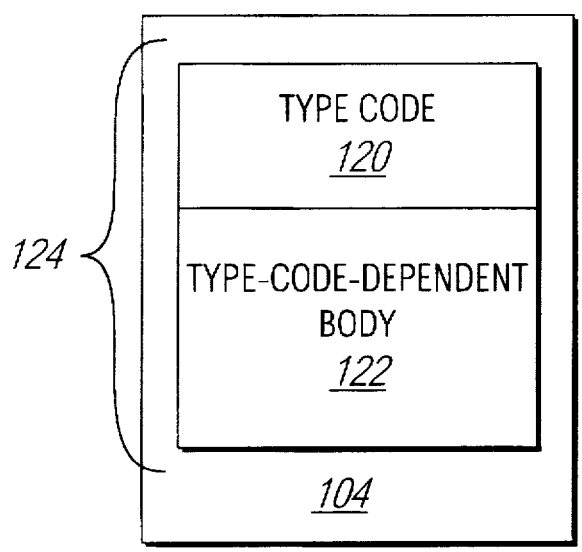
FIG. 2 is a schematic representation of a value object in accordance with the present invention.

FIG. 2 illustrates the structure of the data elements 124 held by a value object 104. The data is arranged in an internal memory representation in which each data element 124 of includes a type code 120 defining the type of the data, and a data member 122 that is dependent on the type code 120. In a preferred embodiment, the data member 122 itself may be the actual data for the data element 124, or a reference to another data element, thereby allowing hierarchical arrangements of data in the first computer memory 114a. The type code 120 may be fixed size value, such as a single byte, or greater or lesser number of bits, or it may be Referring again to FIG. 1, at some point in time, the first application 102a initiates a transfer of the value object 104a to a second application 102b in a second computer memory 114b. This may be done to invoking a remote procedure of the second application 102b, for example. For the example of FIG. 1, there is provided a communication object 113a that handles remote procedures calls and communication between computers. The communication object 113 includes send and receive methods for this purpose. The communication object 113 is shown separately from the application 102 for clarity, but is typically included in it.

When invoked to transmit the value object 104a, the send method of the communication object 113a invokes a flatten method 110 of the value object 104a. In a preferred embodiment, the flatten method 110a is a method of the value object 104 class. Alternatively it may be a separate procedure. The flatten method 110a reads the data elements 124 of the value object 104a from the first computer memory 114a and constructs a byte stream 112 which is passed back to the communication object 113a. The arrangement preserves the semantic structure of the data elements 124 as stored in the memory. In particular, the arrangement in the byte stream 112 corresponds to a depth-first traversal of all hierarchical data elements 124 in the value object 104a, and duplicates the type codes 120 and data members 122 thereof. This transmission representation then is easily transportable to the memory 114b of a second computer on some transmission medium on the network 108. The transmission medium may be any conventional transmission substrate, such as wire, fiber optics, an infrared signal, a wireless signal, or variations of any of these.

A receiving application 102b in the memory 114b of the second computer collects the transmitted data stream 112, for example in a communication object 113b. The communication object 113b invokes an unflatten method 110b to unflatten the data stream 112 and restore the data elements 124 in another instance 104b of the value object. Again, the memory representation of this second instance of the value object 104b is identical in semantic structure to the data stream 112, and to the original value object 104a. The second application 102b is then able to operate on the second value object 104b in an ordinary manner.

Distinct from conventional data transfer methods, in this aspect of the present invention, no conventional marshalling routines are used to marshall the data of the value object 104a into the data stream 112 for transmission to the second computer. This is because, unlike conventional data arrangements as stored in memory which typically use implicit typing, in this aspect of the present invention, the type of each data element 124 is explicitly specified, both in the memory representation of the object, and in its transmission representation in the byte stream 112. In this manner, the applications programmer need only invoke remote procedure mechanism, or other transfer function, without having to write programming code to marshall the data into the transmission representation of the byte stream 112.

Figure 3A:
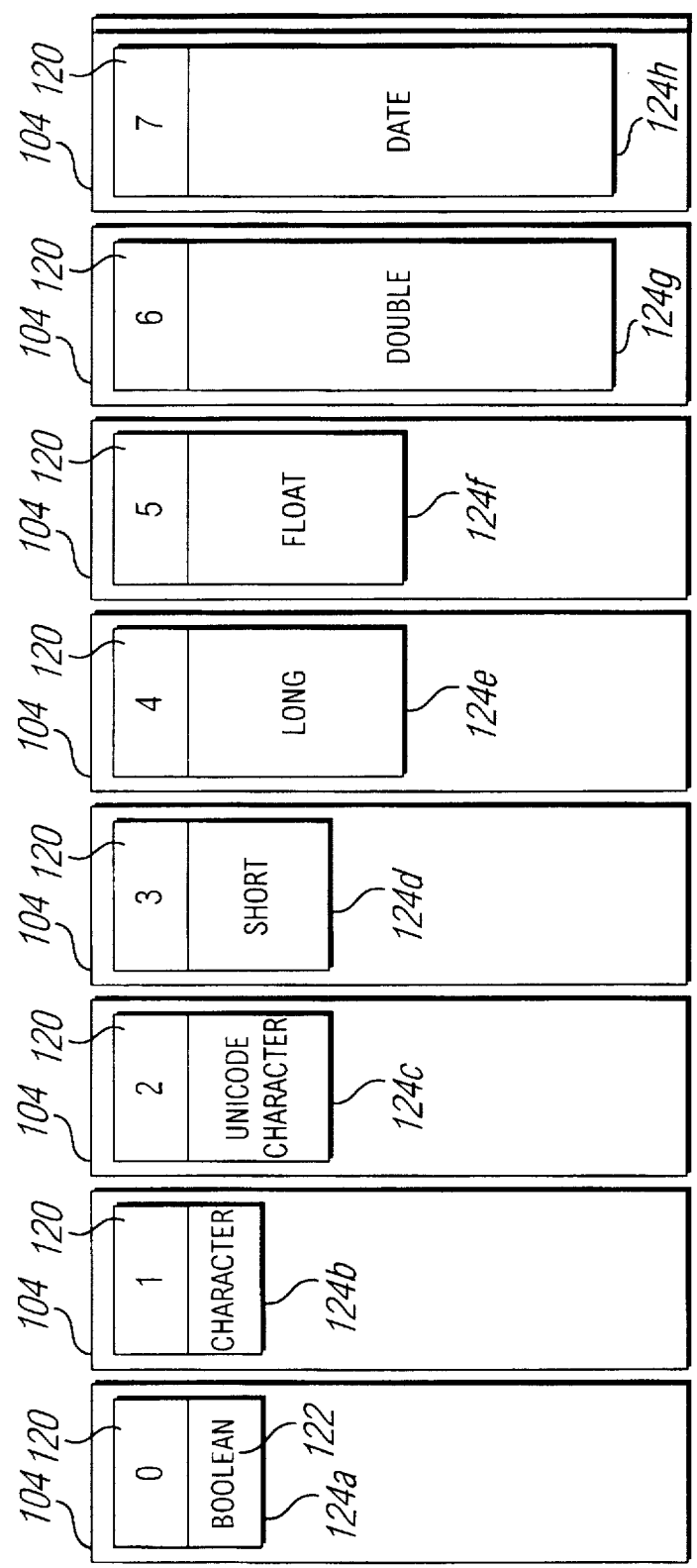
FIG. 3a illustrates schematic representations of the storage arrangements for scalar type data elements in a value object.
Figure 3B:
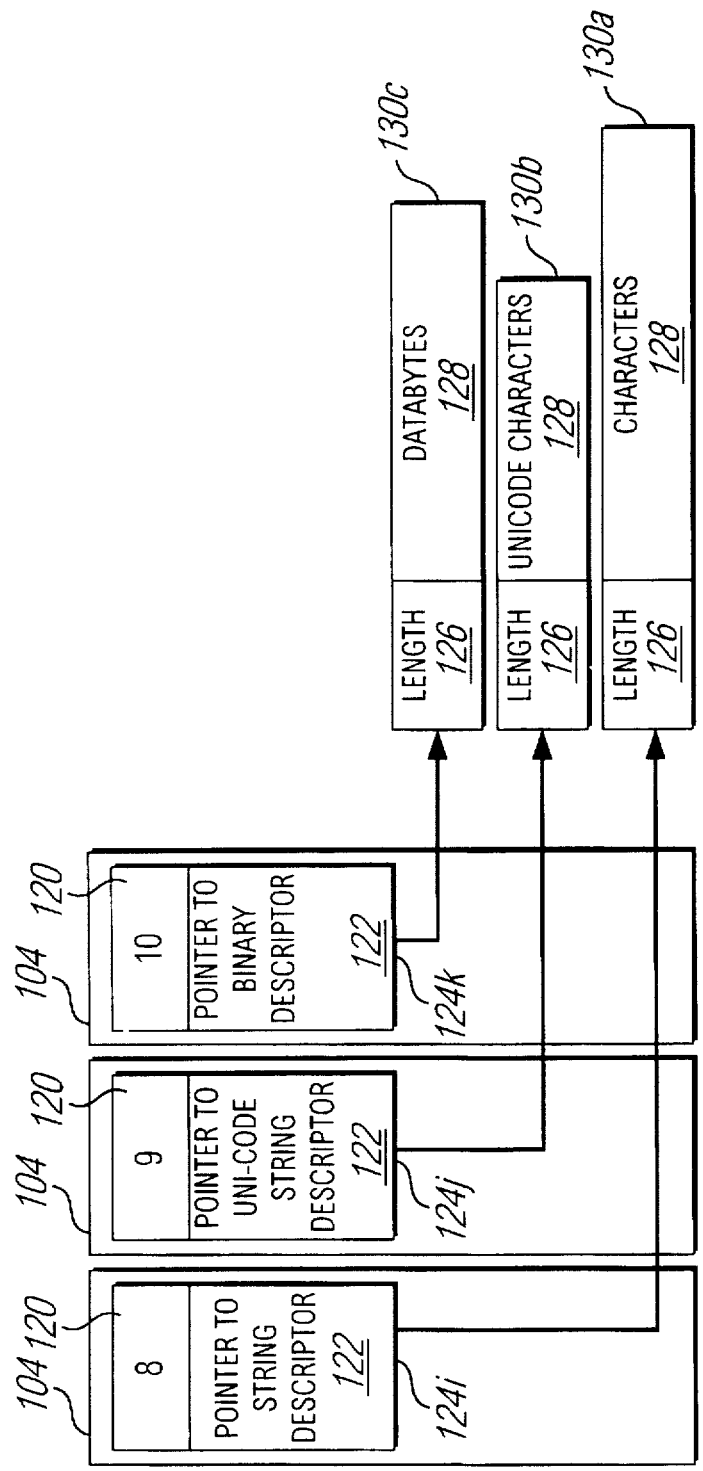
FIG. 3b illustrates schematic representations of the storage arrangements for blob type data elements in a value object.
Figure 3C:
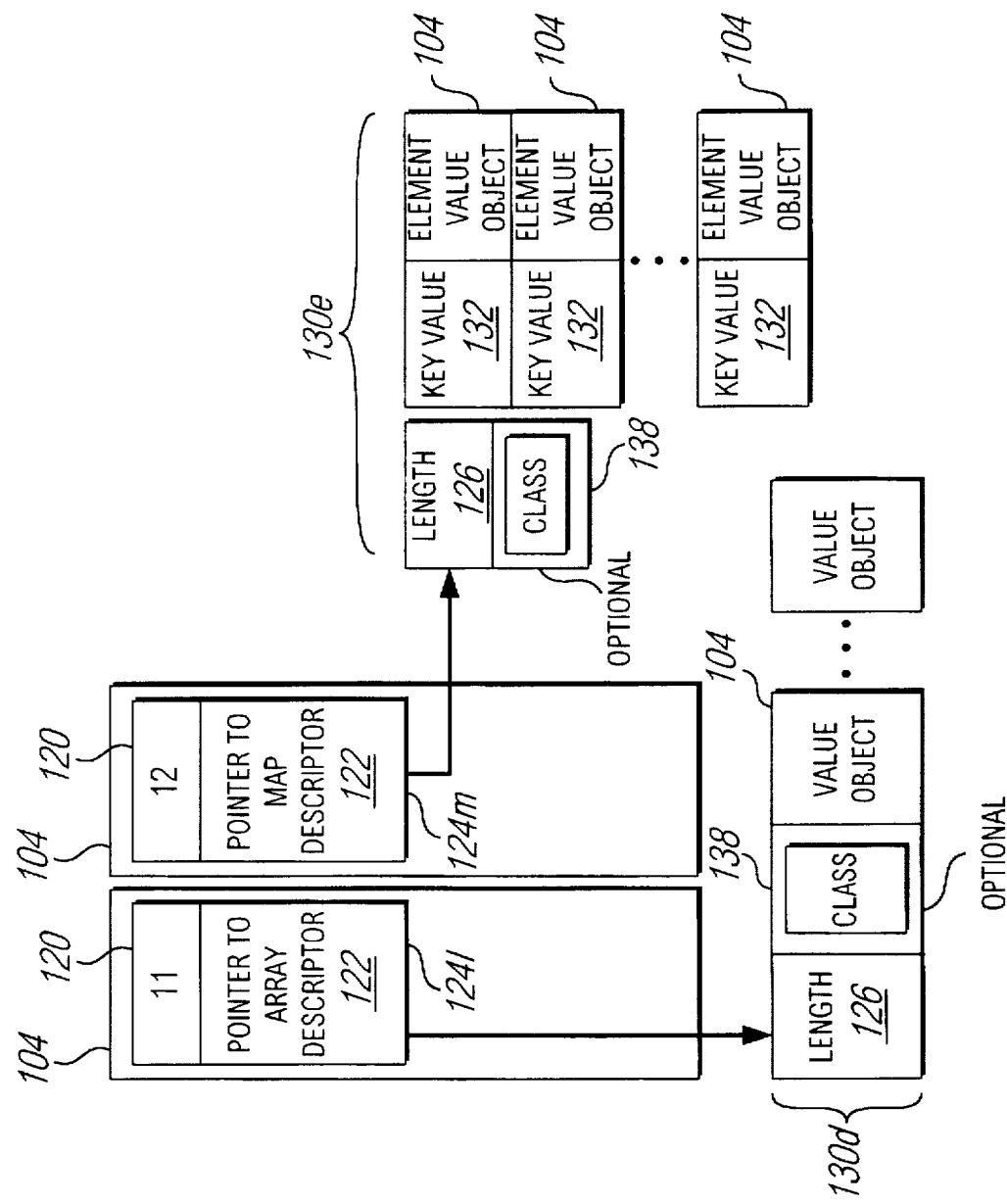
FIG. 3c illustrates a schematic representation of the storage arrangements for aggregate type data elements in a value object.

Referring now to FIGS. 3a, 3b, and 3c, there are shown schematic representations of the storage arrangements for various types of data elements 124 that a value object 104 can hold. The types of data elements 124 that may be held by a value object 104 may be usefully categorized into three groups:

1) scalar: a data element 124 with a fixed length;
2) blob: a data element 124 with a variable number of units of data of a single type as its data member 122; and,
3) aggregate: a data element 124 with a variable number of any arbitrary types of value objects 104 as its data member 122.

Referring particularly then to FIG. 3a, there are shown the data storage arrangement for scalar data elements 124. In a preferred embodiment, scalar data elements 124 may include Boolean, character, Unicode character, short or integer, long, float, double, and date, illustrated as data elements 124a to 124h, respectively. As generally described with respect to FIG. 2, scalar data elements have a type code 120 that identifies the scalar type, and a data member 122 defined by the type code 120. In FIG. 3a, the type codes 120 for Boolean, character, Unicode character, short, long, float, double, and date are illustrated as the integers 0 to 7, respectively. The other types described herein are illustrated with subsequent integers in FIGS. 3b and 3c. These type code 120 values will be used for discussion purposes, but are not intended to limit the variety of type codes 120 that may be used.

Each scalar data element 124 preferably has a printed representation, useful for outputting the data member, such as to a screen display or printer.

The printed representation Booleans, integers, floats, longs and doubles is conventional.

Character data elements 124b are preferably ASCII characters, represented by the numbers (−128 to 127), though other character sets (e.g. EBCDIC) may be used. Unicode characters data elements 124c are 16 bit numbers in the range of (−32768 to 32767).

The printed representation of an ASCII character is:

TABLE 1

| | |
|---|---|
| $c | If the character is in the ASCII range 32–127, except for backslash, where c is the ASCII character. |
| $\\ | If the character is a backslash. |
| $\t | If the character is a tab. |
| $\xx | Where 'xx' are two hexadecimal digits, for all other character values. |

The printed representation of a Unicode character is

→$\uxxxx where 'xxxx' consists of four hexadecimal digits. The notation "→" will be used throughout to indicate the printed representation of a value object 104 or other data.

A date data element 124h stores data defining a point in time. Dates are preferably maintained in memory as GMT times, and are then converted to local time by the application 114 or operating system.

The printed representation of a date is an array of the form:

→[year, month, day, hour, minute, second, fraction]

where year is a four-digit year (e.g. 1982), month is a number in the range 1 ... 12, and day is a number in the range 1 ... 31, hours are in the range 0–23, and minutes and seconds are in the range of 0–59. Fractions of a second is a 32-bit number in nanoseconds. Alternatively, an is GMT boolean element may be added indicating whether timestamp is GMT or local time, and thereby eliminating the need to always convert to local time. One alternative implementation of a date data element 124h uses an array, and will be described below.

In one embodiment, scalar types do not include other data elements 124 at all. Accordingly, the memory representation of a scalar data element 124 is identical to its transmission arrangement. The flattener 110 need only to read out (or in, during unflattening) the type code 120 and data member 122 directly to (or from) the data stream 112.

Referring now to FIG. 3b, there are shown the data storage arrangements for blob type data elements 124. In a preferred embodiment blob type data elements 124 include string, Unicode string, and binary, illustrated as data elements 124i to 124k, respectively. Each blob data element 124 has a type code 120, and a data member 124 that references a descriptor 130. The descriptor 130 includes a length field 126, and a content field 126. The length field 126 specifies a number of units of data of a specific type.

Thus, a string data element 124i includes in the content field a number of characters. A Unicode string data element 124j includes in the content field 128 a number of Unicode characters.

A binary data element 124k includes in the content field 128 a number of uninterpreted bytes (or other size of data). Binary data elements 124 are useful for storing and transmitting audio data, video data, graphics, and the like. As will be discussed below, because a value object 104 may include, via an aggregate type data element 124, numerous different types of data elements 124 in a single object, binary data element 124, for example of a graphics file, can be directly stored intermixed with string data elements, (e.g. a text file) describing the binary data element 124, and a date data element 124 describing the creation date, modification date, or the like, of the graphics file. One alternative implementation of blob data elements 124k uses an array and will be described below.

As noted above, in the preferred embodiment, a blob data element 124 has as its data member 124 a reference to the descriptor 130. This is used in the memory representation of the value object 104 to access the parts of descriptor 130 in the local memory. Since the local memory reference is not valid when transferred to another computer, the flattener 110, when flattening a blob data element 124, obtains the descriptor 130 and directly builds it into the data stream 112 immediately following the type code 120 for the data element. This preserves the semantic structure of the memory representation and the transmission representation of the data element 124, and hence the value object 104 incorporating a blob data element 124.

Referring now to FIG. 3c, there are shown the data storage arrangements for aggregate type data elements 124. In a preferred embodiment aggregate data elements 124 include array and map, illustrated as data elements 124i to 124k, respectively. Each aggregate data element 124 has a type code 120, and a data member 122 that references a descriptor 130, as with blob data elements 124. The reference is preferably a pointer to the descriptor 130, though other forms of reference may be used, such as indices, handles, or the like.

For an array data element 124l, the descriptor 130d includes a length field 126, and a number of value objects 104, the number specified by the length field 126. Thus, array data element 124l defines a simple vector of values. Array data elements 124l are zero indexed. The value objects 104 contained by an array data element 124l may be of any type, including other array data elements 124l, or map data elements 124m.

The printed representation of an array is:

→[element1, element2, ... ]

where each element is printed according to its own printed representation, as described above.

A map data element 124m is a collection of a number of <key 132, value object 104>pairs called map entries 136. Keys are preferably scalar type data elements, and are all of a same specific type. In other embodiments, varied types for keys may be used. The value objects 104 may be of any type, including arrays and maps. Accordingly, the descriptor 130e in a map data element 124m includes a length field 126 specifying the number of pairs of key value 132 and value objects 104. The map entries 136 are not guaranteed to be in any particular order. The printed representation of a map is:

→{key: value object key: value object ... } where each key and value object is printed as defined above.

Because the aggregate data elements 124 include other value objects 104 in their data elements 124, they may be used to create hierarchical arrangements of data. The flattening and unflattening process preserves the hierarchical arrangement of data, and thereby the semantic structure of the value object 104 between its memory representation and its transmission representation.

Array data elements 124l and map data elements 124m may optionally include a class field 138. The class field 138 contains a programmer defined value associated with the array data element 124l or map data element 124m. This allows the programmer to define particular operations that manipulate arrays or maps according to their class field 138. When a class field 138 is defined, the provided value is also output in the printed representation of the data element.

Figure 4:
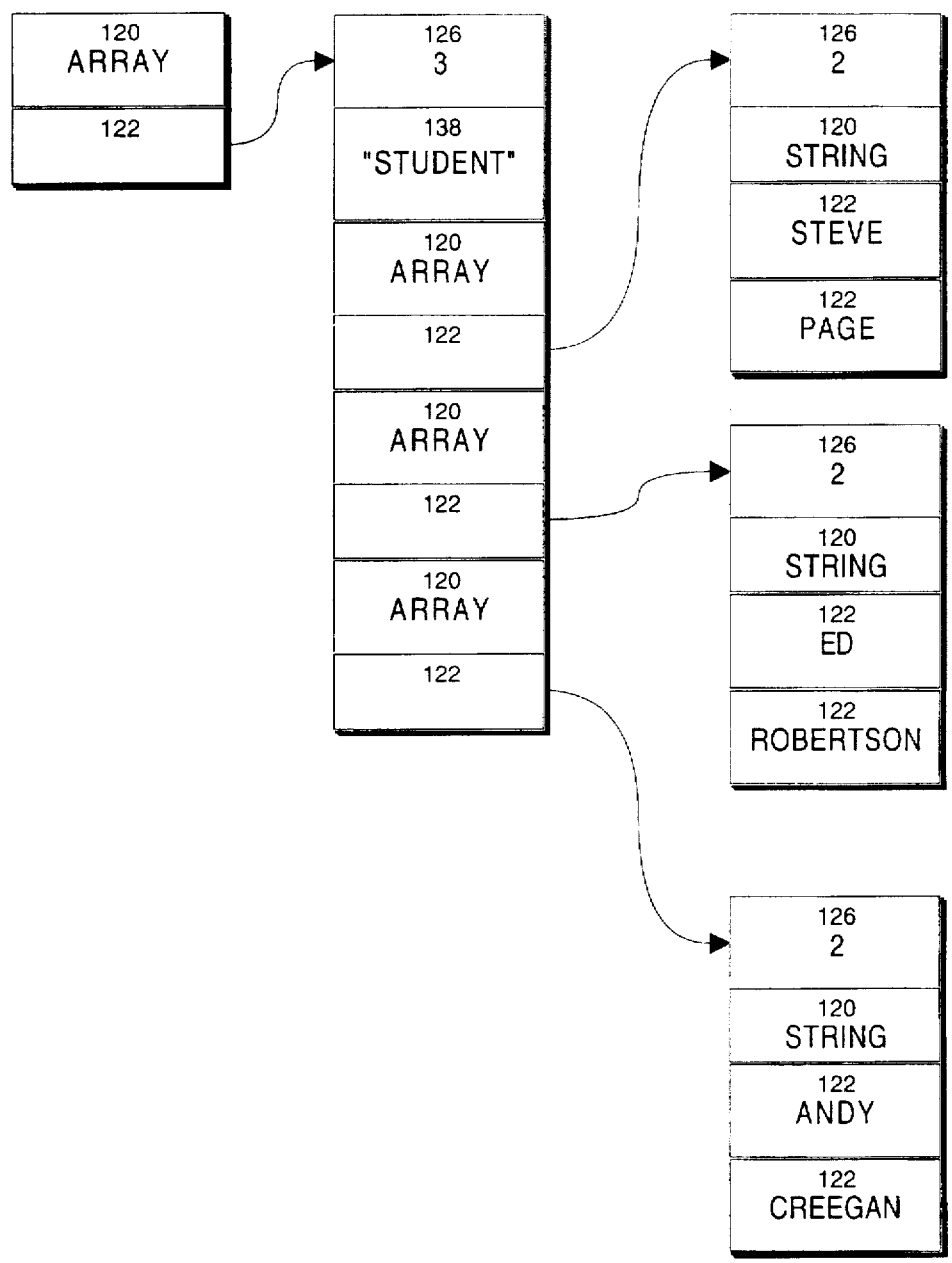
FIG. 4 is an illustration of the storage arrangement of an instance of an array in a value object.

FIG. 4 illustrates a schematic representation of an instance of an array data element 124l in a value object 104. Here, the array data element 124l is an array of class 138 "STUDENTS", and has three data elements, each of which is an array data element 124l with two string data elements 124i.

As noted above, in one embodiment, scalar data elements 124 do not include other data elements 124. In an alternative embodiment, scalar types remain fixed in length, but may include other types of data elements 124, or even value objects 104. An example of this would be a date data element 124h defined using a array data element 124l, having a predetermined number of entries, such as seven, one each for year, month, day, hour, minute, second, fraction of second. The number of elements would be stored in the length field 126, as before.

Similarly, blob type data elements may also be alternatively assembled from array data elements 124l. In such an embodiment, a binary data element 124k is an array data element 124l with an optional class field 138 value defining a user selected class value (e.g "movie", "graphic", "code"), and a length field 126 for the length of the binary data, and the data itself.

The type codes 120 illustrated in FIGS. 3a–3d are merely illustrative, in order to demonstrate the structure of the data elements 124 in a value object 104. Table 2 describes the type codes 120 used in a preferred implementation:

TABLE 2

| Type of Data | GetType Result | Type Code Stored in Memory | Type Code for Transmission |
| --- | --- | --- | --- |
| Boolean | 0 | 0 | –61 |
| Character | 2 | 1 | –59 |
| Unicode Char. | 1 | 2 | –58 |
| Short | 2 | 3 | –57 |
| Long | 3 | 5 | Range: –64–63 |

TABLE 2-continued

| Type of Data | GetType Result | Type Code Stored in Memory | Type Code for Transmission |
|---|---|---|---|
| | | | Code: [00Sxxxxx] |
| | | | Range: −8192–8191 |
| | | | Code: [01Sxxxxx] [xxxxxxxx] |
| | | | Range: all others |
| | | | Code: [11000000] [MSB] [] [] [LSB] |
| Float | 4 | 6 | −55 |
| Double | 5 | 7 | −54 |
| Date | 7 | 8 | −53 |
| String | 8 | 15 | −52 |
| Unicode String | 8 | 16 | −51 |
| Binary | 8 | 17 | −49 |
| Array | 9 | 19 | −47 |
| Map | 9 | 20 | −44 |

In Table 2, the GetType result is used merely to provide a correspondence with similar type codes used in Visual Basic. Note that Visual Basic does not fully recognize the distinctions in type between many of the data elements recognized in the present invention. The second column, Type Code Stored in Memory is the preferred type code 120 for the memory representation of a data element 124. The last column, Type Code for Transmission, is the preferred type code 120 for the transmission representation of a data element in a transmission medium.

In addition to being specified with particular number values, type codes 120 may also be ranges of values, or sets of values. That is, a predetermined set, or range of numbers, may be selected as all identifying a particular type of data element 124. For a simple example, all values between 0 and 9 may be selected as the type codes 120 for short data elements 124d, and values 10 to 19 may be selected as the type codes 120 for float data elements 124f. This is the inverse of the duplication of type codes 120 in the GetType column.

In one preferred embodiment, the type codes 120 for selected ones of the types of data elements 124 are determined according to a frequency distribution of the data values of the data elements. This allows the actual data values themselves to serve as both the type code 120 and the data member 122 for at least one type of data element 124. Having the data values of the data element 124 serve both functions reduces the amount memory required for storing (providing a form of data compression), and the time and bandwidth required for transmitting for these frequently used values and types of data element 124.

The third column of Table 2 illustrates this feature of the invention. For example, it may be determined that a particular set of long data values used in long data elements 124e are frequently stored and transmitted, for example, long data values between −64 and 63. This range of values is then selected as the type codes 120 for long data elements 124e. When a data element 124 is retrieved and the type code 120 is read, if the value of the type code 120 is in the specified range, then the flattener 110, or other code in an application 114, knows that the data element 124 is a long data element 124e, and decodes/encodes the rest accordingly, using that part of the data in the type code 120 space as value of the data member 122. If the value of the type code 120 is outside the range, then data element 124 are treated as described, with specific type codes 120. In this example a range of values is used, but logically, any set of values could be used for this optimization. This optimization of the type code 120 further increase the performance of the system for storing and transmitting data.

The domain over which the frequency determination is made may vary. For example, the frequency distribution may be determined with respect to any variety of applications 114. This type of determination would be useful, for example, when the value object 104 is provided as class in a general programming environment, and may be used by applications programmers to construct any variety of applications, including client-server applications of any type. In this type of embodiment, the selection of the type codes 120 would be made by the provider of the programming environment.

Alternatively, the domain may be limited to particular classes of applications, preferably based on empirical testing of the application behaviors and usage characteristics. Thus, for examples, it may be determined that word processors use string data elements 124i most frequently with the ASCII values. In this case, values between −128 and 127 are used as both the type code 120 and the data member 122 of the data element 122, again, reducing the memory and network requirements for this class of application. The provider of the programming development environment would provide a table that applications programmers can select from when creating their applications that would identify the type of application, and thus the type codes 120 for the data elements 124. In order to facilitate data transfer between applications of different types, each application would include a table with type codes for all other types of applications. When a connection is initially made between applications, they would exchange their application types, and then use that information to decode the value objects between transmitted between them.

Finally, in other alternative embodiments, the type codes 120 may be specified by the applications programmer herself, based on any desirable criteria.

It should be noted that the type codes 120 used in the transmission representation, as for example in Table 2, are then translated to memory representation type codes 120, and vice versa, by the flattening and unflattening methods.

As described above, the value object 104 is able to output its data elements 124 into "flattened" byte stream 112 for transmission over a network. The flattened byte stream 112 has identical semantics to the memory representation with the hierarchical arrangement of data. The flattener 110 is preferably implemented as a flatten method of the value object 104. A preferred implementation of the flatten method operates using recursive descent in order to unnest nested array data elements 124l and map data elements 125m. One pseudo code description of a flatten method is as follows:

```
procedure: flatten (dest_buffer)
    switch (type_code)
        case: array_code
            if class != nil
                emitClass (class, dest_buffer)
            emitNumber (t_array_code, dest_buffer)
            emitNumber (no. of elements, dest_buffer)
            emitNumber (class, dest_buffer)
            for all elements i
                element[i].flatten (dest_buffer)
        case: map_code
            if class != nil
                emitClass (class)
            emitNumber (t_map_code, dest_buffer)
            emitNumber (no. of elements, dest_buffer)
            emitNumber (class, dest_buffer)
            for all elements i
                element[i].flatten (dest_buffer)
        case: binary_code
            emitNumber (t_binary_code, dest_buffer)
            emitNumber (length, dest_buffer)
            emitBytes (length, source_buffer, dest_buffer)
        case: unicode_string_code
            emitNumber (t_unicode_string_code, dest_buffer)
            emitNumber (length, dest_buffer)
            emitBytes (length, source_buffer, dest_buffer)
        case: string
            emitNumber (t_string code, dest_buffer)
            emitNumber (length, dest_buffer)
            emitBytes (length, source_buffer, dest_buffer)
        case: date_code
            emitNumber (t_date_code, dest_buffer)
            emitBytes (sizeof (date), source_buffer, dest_buffer)
        case: double_code
            emitNumber (double_code, dest_buffer)
            emitBytes (sizeof (double), source_buffer, dest_buffer)
        case: float_code
            emitNumber (t_float_code, dest_buffer)
            emitBytes (sizeof (float), source_buffer, dest_buffer)
        case: long_code
            emitNumber (value, dest_buffer)
        case: short_code
            emitNumber (t_float_code, dest_buffer)
            emitBytes (sizeof (float); source_buffer, dest_buffer)
        case: unicode_char_code
            emitNumber (t_unicode char_code, dest_buffer)
            emitBytes (sizeof (unicode_char), source_buffer,
                dest_buffer)
        case: char_code
            emitNumber (t_char_code, dest_buffer)
            emitBytes (sizeof (char), source_buffer, dest_buffer)
        case: boolean_code
            emitNumber (t_boolean_code, dest_buffer)
            emitBytes (sizeof (boolean), source_buffer, dest_buffer)
procedure: emitClass (class, buffer)
    emitNumber (class_code)
    emitNumber (length of class)
    emitBytes (length of class, source_buffer, dest_buffer)
```

The procedure emitNumber(value, destination$_{13}$ buffer) outputs the byte of value to the destination buffer, which may be coupled to a network socket or other network connection. In the flatten method the values are the transmission representation type codes 120, and in the unflatten method they are memory representation type codes 120. The procedure emit bytes(number of bytes, source$_{13}$ buffer, destination$_{13}$ buffer) reads the number of bytes from the source buffer to the destination buffer. The first two cases perform the recursive descent through a hierarchical arrangement of data. The remaining cases structure the output bytes in the transmission representation, that is the actual byte ordering that is transmitted between two computers (or that may be restored locally). The procedure emitClass(class, buffer) outputs a class code (e.g. −50), the length of the class, and bytes from the buffer containing the actual class data.

The flatten method also puts the output in network standard order, as needed. The flatten method thereby creates the transmission representation of a given value object 104, with all hierarchical relationships between the data preserved. One preferred implementation of the flatten method is further described below, using an intermediate data structure, a flat value object, to hold the flattened data stream 112.

Figure 5:
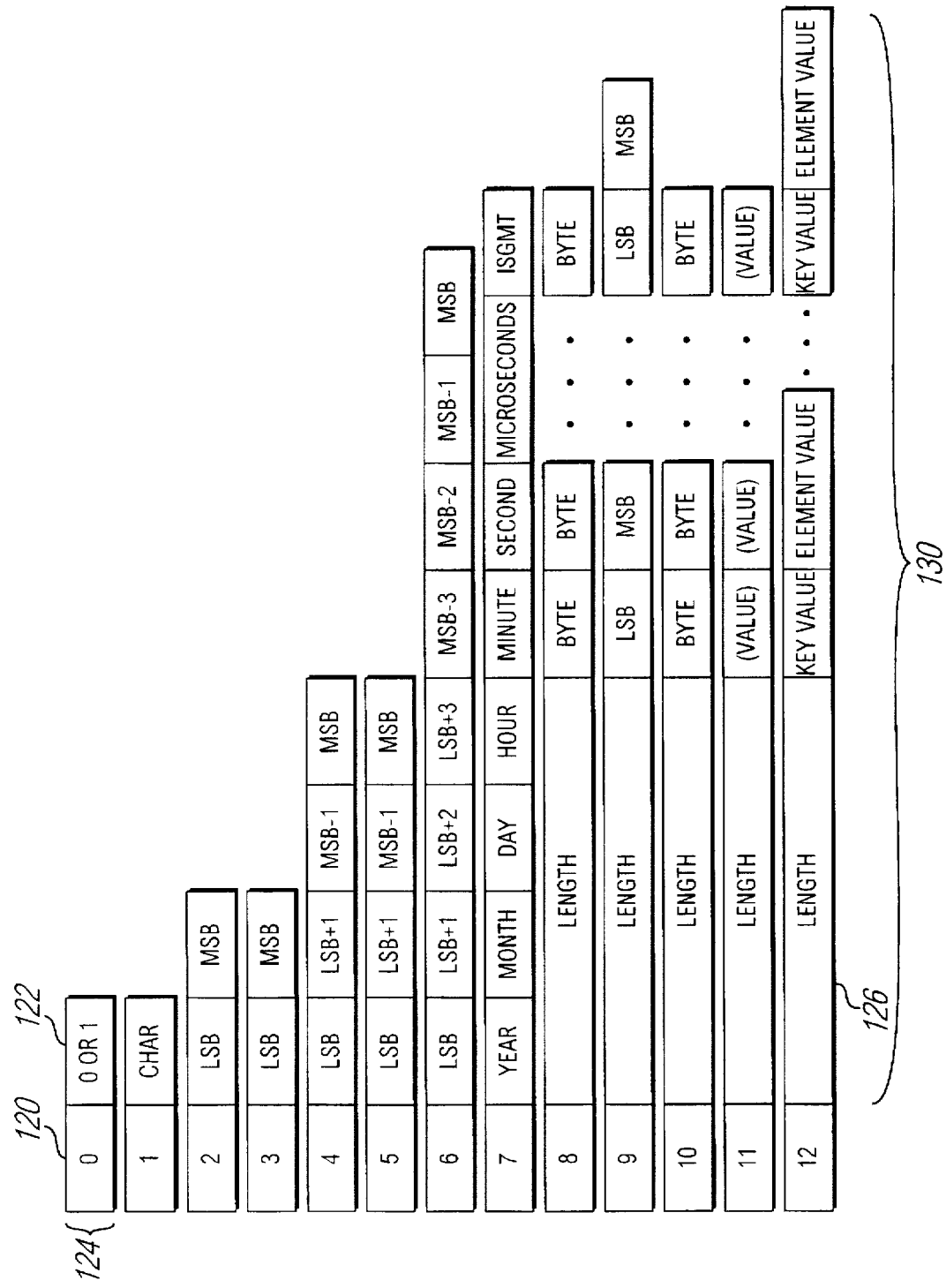
FIG. 5 illustrates a schematic representation of the flattened data of various types in a value object, as suitable for transmission between computers.

FIG. 5 illustrates schematically the flattened transmission representation of the various types of data elements 124 capable of being held by a value object 104. The type code 120 values used in FIG. 5 are the same as those used in FIGS. 3a–3c, and are merely illustrative. The placement of the class field 138 is not shown. If a class field 138 is used, then it preferably prefixes the data stream for the data element 124.

The value object 104 is likewise capable of reconstructing itself from the flattened data stream 112. An "unflatten" method (see the Get method, below, for one implementation) operates in a similar manner to the flatten method to perform this reconstruction. The unflatten method adds in each case a call to allocate a new instance of a data element 124 of the type defined by the type code 120, and then reads the data from a source buffer into the data element.

In addition to being able to hold a large number of different types of data, a value object 104 can dynamically (after instantiation) alter or change the type of any of its data elements. Thus, once a data element 124 in a value object 104 is created as a first type, for example, an short, it may subsequently changed to a different type of data. Examples of methods for these types of manipulations are further described below with respect to the Set methods.

A value object 104 supports a number of methods to get, set, create, test, remove, add, and otherwise manipulate the data elements 124 in the object. As explained above, value objects 104 may include aggregate types of data, such as array and maps, thereby allowing complex hierarchical arrangements of data elements 124. Accordingly, in the methods of the value object, each data element 124 in any aggregate type value object 124 is addressable using a path expression. A path is a sequence of array indices or map entries that specifies a "trip" from an outer value (such as an array or map) to some inner value. More particularly, each element $E_i$ in a path expression is an index into an array or map defined at element $E_{i-1}$, where $E_0$ is a top level array. Paths are most easily explained by examples.

For example, a value object v may be created with a five element array data element 124:

v.SetArray 5

Here, the "5" is the path expression. The third element of the array may be set to some string:

v.Set 2, "Frogstar"
Debug.Print v.GetString
−> [nil, nil, "Frogstar", nil, nil]

The path in this call to a Set method is a one-element path "2". The final argument to Set, the string "Frogstar", is the value to set the element pointed to by the path. The Print method outputs the printable representation of the value object v. "nil" is the value a data member takes when it is initially created, and not specified.

A nested array data element 124*l* may be added:

```
v.SetArray 3, 2
Debug.Print v.GetString
-> [nil, nil, "Frogstar", [nil, nil], nil]
```

This dynamically changes the third element to a array data element 124*l* with two elements.

The nested array by adding an index to the path:

```
v.Set 3, 0, "Thing 1"
v.Set 3, 1, "Thing 2"
Debug.Print v.GetString
-> [nil, nil, "Frogstar", ["Thing 1", "Thing 2"], nil]
```

The path "3, 1" in two calls to Set above start with the index of the inner array (3) and include an index into the inner array (0 or 1). The last argument to Set is always the value to set.

Paths are also used with map data elements 124*m*. A value object V including a map data element 125*m*, that itself containing an array data element 124*l* and another map data element 124*m*:

```
v.SetMap
v.SetArray "a", 0
v.SetMap "b"
Debug.Print v.GetString
-> {a: [], b: {}}
```

By specifying the key "a" as the first element of a path, further elements may be added to the nested array:

```
v.AddLast "a", 42
v.AddLast "a", 99
v.AddLast "a", 50
Debug.Print v.GetString
-> {a: [42, 99, 50], b: {}}
```

Likewise, by specifying the key "b" as the first path element, elements may be added to the nested map:

```
v.Set "b", "x", "Fred"
v.Set "b", "y", "John"
Debug.Print v.GetString
-> {a: [42, 99, 50], b: {x: "Fred", y: "John"}}
```

Another map may be added inside the already nested map:

```
v.SetMap "b", "z"
v.Set "b", "z", "q", 99
Debug.Print v.GetString
-> {a: [42, 99, 50], b: {x: "Fred", y: "John", z: {q: 99}}}
```

The map entry q is printed by calling GetString with the path "b", "z" and "q":

```
Debug.Print v.GetString("b", "z", "q") -> 99
```

As is evident, depending on the nesting, paths, and the hierarchical arrangement of data storage in value objects 104 may be arbitrarily complex.

As noted, the value object 104 supports a variety of different methods for manipulating the data elements contained therein. Table 3 through Table 12 define the interfaces (in Visual Basic syntax) of the preferred methods of the value object 104. Here path refers to path expressions previously described:

TABLE 4

Getting and Setting ( index )
value ! symbol
Count [path]
Extract [path,] index, count
Get [path]
GetClass [path]
GetElem [path,] index
GetKey [path,] index
GetType [path]
Hash [path]
Length [path]
Set [path,] value
SetClass [path,] class

TABLE 5

Stringizing

GetString [path]
GetVBString [path]
SetString [path]
SetVBString [path]

TABLE 6

Adding

Add [path,] item
AddUnique [path,] item
AddFirst [path,] item
AddLast [path,] item

TABLE 7

Removing

Delete [path,] index, count
Remove [path,] indexOrKey
RemoveFirst [path]
RemoveLast [path]
RemoveValue [path,] value

TABLE 8

Modifying

Insert [path,] index, count
InsertValue [path,] index, value
SetLength [path,] length
Sort [path]

TABLE 9

Testing

IsAggregate [path]
IsArray [path]
IsBinary [path]
IsBoolean [path]
IsChar [path]
IsDate [path]
IsDouble [path]

TABLE 9-continued

| Testing |
| --- |
| IsFloat [path] |
| IsGMT [path] |
| IsInteger [path] |
| IsLong [path] |
| IsMap [path] |
| IsNil [path] |
| IsNumber [path] |
| IsObject [path] |
| IsSet [path] |
| IsSorted [path] |
| IsString [path] |
| IsSymbol [path] |
| IsUnicodeChar [path] |
| IsUnicodeString [path] |
| Equals [path,] value |
| Exists [path] |

TABLE 10

| Copying |
| --- |
| Clone [path] |
| Flatten [path] |

TABLE 11

| Creation Methods |
| --- |
| SetArray [[path,] length] |
| SetBinary [path,] contents, class |
| SetMap [path] |
| SetNil [path] |
| SetSet [path] |
| SetSorted [path] |
| SetSymbol [path,] string |
| SetUnicodeChar [path,] value |
| SetUnicodeString [path,] string |

TABLE 12

| Factory Methods |
| --- |
| NewArray [size, value] |
| NewBinary contents, class |
| NewBoolean [initialValue] |
| NewDouble [initialValue] |
| NewFloat [initialValue] |
| NewInteger [initialValue] |
| NewLong [initialValue] |
| NewString [initialValue] |
| NewSymbol [initialValue] |
| NewUnicodeChar [initialValue] |
| NewUnicodeString [initialValue] |
| NewMap |
| NewSet |
| NewSorted |
| NewValue [string] |

TABLE 13

| "Ops" (see documentation) |
| --- |
| ArrayToMap |
| GetPat pattern |
| GetPID |
| MapToArray |
| MD5 |
| Merge map |

TABLE 13-continued

| "Ops" (see documentation) |
| --- |
| RegGet rootHandle, regPath, reg ValueName |
| RegGetString rootHandle, regPath, regValueName |
| RegSet rootHandle, regPath, regValueName |
| RegSetString rootHandle, regPath, regValueName |
| SortBy description |
| StripPat pattern |
| StripNotPat pattern |
| ToLower |

TABLE 14

| Misc |
| --- |
| AsGMT [path] |
| ErrorText errorNumber |
| Find [path,] value |
| Frac [path] |
| Version |

The operation of each of these methods is as follows:
(index)
value (index)

Parenthesis are used to get or set array elements and map entries.

TABLE 15

| | |
| --- | --- |
| Array | The index must be a positive value. For assignment, if the array is too small then the array is grown as necessary |
| Sorted Array or Set | The index must be positive and less than the size of the array. This syntax can only be used to retrieve a value - it cannot be used for assignment. |
| Map | The index can be any value, and is the map entry's key. |

If the first assignment to an uninitialized value object 104 is with parenthesis, the object will automatically turn into an array:

```
Dim v As New Wvalue
v(0) = "in an array"
Debug.Print v.GetString
 → ["in an array"]
```

EXAMPLE

```
Dim v As New WValue
v.SetArray
v(0) = "Fred"
v(1) = "Jones"
Debug.Print v.GetString
 → ["Fred", "Jones"]
v.SetMap
v(0) = "Fred"
v(1) = "Jones"
Debug.Print v.GetString
 → {0: "Fred", 1: "Jones"}
``` value ! name
value ! name

Visual Basic's "!" syntax can used to get or set map entries by name.

The value must be a map.

A map entry can be created (or set) with assignment:

```
Dim v As New WValue
v.SetMap
v!FirstName = "Fred"
v!LastName = "Jones"
Debug.Print v.GetString
→ {FirstName: "Fred", LastName: "Jones"}
```

Likewise, map entries can be retrieved by name:

Debug.Print v!FirstName, v!LastName→Fred Jones

If the first assignment to an uninitialized value object 104 is with "!" syntax, the value object 104 will automatically become a map.

```
Dim v As New Wvalue
v!FirstName = "Marcus"
v!LastName = "Garvey"
Debug.Print v.GetString
→ {FirstName: "Marcus", LastName: "Garvey"}
```

Add value.Add [path,] value

This method adds the value to an aggregate. The path must refer to an aggregate value.

The exact behavior of Add depends on the kind of aggregate that the value is being added to:

TABLE 16

| | |
|---|---|
| Array | The value is appended to the array. This is the same as using AddLast. |
| Sorted Array | The value is placed in the sorted array in the correct, sorted position. |
| Set | If the value is not present in the set, it is added. |
| Map | The value is added to the map as if mapValue.Set value, NULL were used. |

EXAMPLE

```
Dim v As New WValue
v.SetArray
v.Add "Fred"
v.Add "Joe"
Debug.Print v.pp
→ ["Fred",
    "Joe"]
v.SetMap
v.Add "Fred"
v.Add "Jones"
Debug.Print v.pp
→ {Fred: nil,
    Jones: nil}
```

AddFirst value.AddFirst [path,] value

This method prepends a value to an array. The path must refer to an array, the value can be any value.

This method can also be used to prepend a binary or string to another binary or string. Both values must be of the same type (binary or string).

EXAMPLE

```
Dim v As New WValue
v.SetArray
v.AddFirst "Fred"
v.AddFirst "Joe"
v.AddFirst "Twonky"
Debug.Print v.pp
→ ["Twonky",
    "Joe",
    "Fred"]
```

AddLast value.AddLast [path,] value

This method appends a value to an array. The path must refer to an array, the value can be any value.

This method can also be used to append a binary or string to another binary or string. Both values must be of the same type (binary or string).

EXAMPLE

```
Dim v As New WValue
v.SetArray
v.AddLast "Fred"
v.AddLast "Joe"
v.AddLast "Twonky"
Debug.Print v.pp
→ ["Fred",
    "Joe",
    "Twonky"]
```

AddUnique value.AddUnique [path,] value

Appends a value to an array (or adds a value to a sorted array or set) if the value does not already appear. The path must refer to an array, the value can be any value.

EXAMPLE

```
Dim v As New WValue
v.SetArray
v.AddUnique "Fred"
v.AddUnique "Fred"
Debug.Print v.pp
→ ["Fred"]
```

AsGMT date=value.AsGMT [path]

The path must refer to a value that is a date. The date is returned as a GMT time.

EXAMPLE

```
Dim v As New WValue
v.Set Now
Debug.Print v.Get
→ 12/1/95 6:24:36 PM
Debug.Print v.AsGMT
→ 12/2/95 2:24:36 AM
```

Clone value2=value.Clone [path]

This method returns a copy of the specified value. The copy is deep; operations on the copy or any of its contents will not affect any elements of the original.

EXAMPLE

```
Dim v1 As New WValue, v2 As WValue
v1.SetString "{a:1, b:[1,2,3]}"
Set v2 = v1.Clone
V1!a = 42
v1!b.SetLength 0
Debug.Print v1.GetString
 → {a:42,b:[]}
Debug.Print v2.GetString
 → {a:1,b:[1,2,3]}
```

Count count=value.Count [path]

Returns the number of elements in an object. What the number means depends on the object's type:

TABLE 17

| | |
|---|---|
| Array | Returns the array's length. |
| Sorted Array | Returns the array's length. |
| Set | Returns the number of set members. |
| Map | Returns the number of map entries. |
| String | Returns the number of characters in the string. |
| Symbol | Returns the number of characters in the symbol. |
| Unicode String | Returns the number of characters in the string. |
| Binary | Returns the number of bytes in the binary. |

This method is identical to the Length method.

EXAMPLE

```
Dim v As New WValue
v.SetArray
v.AddLast 1
v.AddLast 2
v.Insert 0,55
Debug.Print v.Count
 → 57
v.Set "This is a string"
Debug.Print v.Count
 → 16
```

Delete value.Delete [path,] index, count

If the value is an array, sorted array or set, the Delete method removes count elements starting at the offset index.

If the value is a string or Unicode string, the Delete method removes count characters starting at the offset index.

If the value is a binary, the Delete method removes count bytes starting at the offset index.

It is not possible to use Delete on any other value types, including symbols and maps.

EXAMPLE

```
Dim v As New WValue
v.SetArray
v.AddLast 4
v.AddLast 5
v.AddLast 6
Debug.Print v.GetString
 → [4,5,6]
v.Delete 1,2
Debug.Print v.GetString
 → [4]
v.Set "This is a string"
v.Delete 4,3
Debug.Print v.Get
 → This a string
```

Equals boolean=value.Equals value2

This method returns true if the value is equal to the argument value, value2. The comparison is deep; the contents of arrays and other aggregates are compared recursively.

Strings are compared without regard to case.

EXAMPLE

```
Dim v1 As New WValue, v2 As WValue
v1.SetString "{a:1, b:[1,2,3], c:'fred'}"
Set v2 = v1.Clone
Debug.Print v1.Equals(v2)
 → True
v1!a = 99
Debug.Print v1.Equals(v2)
 → False
```

ErrorText string=value.ErrorText (errorNumber)

This method returns the text associated with an error returned by the application programming environment.

EXAMPLE

```
Dim v As New WValue
Debug.Print v.ErrorText(0)
 → No error.
Debug.Print v.ErrorText(20000)
 → No memory available.
```

Exists boolean=value.Exists [path]

This method returns true if the specified value exists. Normally this method is used with a path.

This can be used to test if an entry exists in a map:

If myMap.Exists("fred") Then . . .

Or if an element exists in an array:

If myArray.Exists(42) Then . . .

The IsXxxx set of methods (IsArray, IsSet, IsLong, and the like) provide stronger versions of Exists that also check if the specified item is of a particular type.

EXAMPLE

```
Dim v As New WValue
v.SetArray 5
Debug.Print v.Exists(0)
 → True
Debug.Print v.Exists(5)
 → False
v.SetString "{a:1, b:[1,2,3], c:'Fred'}"
Debug.Print v.Exists("a")
 → True
Debug.Print v.Exists("frobble")
 → False
```

Extract result=value.Extract [path,] index, count

The Extract method returns a specified piece of an array, sorted array, set, string, Unicode string or binary, depending on the type of the value:

TABLE 18

| | |
|---|---|
| Array, Sorted Array, Set | Return an array that is a deep copy of the specified array elements. |
| String, Unicode String | Return the specified sub-string . . . |
| Binary | Return a new binary containing the appropriate bytes from the original. |

EXAMPLE

```
Dim v As New WValue
Dim v2 As WValue
v.Setstring "[a b c d e f g h i j k l]"
Set v2 = v.Extract(2, 5)
Debug.Print v2.GetString
  → [c,d,e,f,g]
v.Set "This is a string"
Debug.Print v.Extract(5, 11)
  → is a string
```

Find
index=value.Find [path,] expression

The value specified by the path must be an aggregate. The aggregate is searched to see if it contains the value expression. If it does, an index greater than or equal to zero is returned. If the aggregate does not contain the value, the index −1 is returned.

EXAMPLE

```
Dim v As New WValue
v.Setstring "[Fred Joe John Susan Ralph Guido]"
Debug.Print v.Find("john")
  → 2
Debug.Print v.Find("Donald")
  → −1
v.Setstring "{Fred: true, Joe: false, John: true, Susan: false}"
Debug.Print v.Find("john")
  → 2
Debug.Print v.Find("Donald")
  → −1
```

Flatten
flattener=value.Flatten

Figure 6:
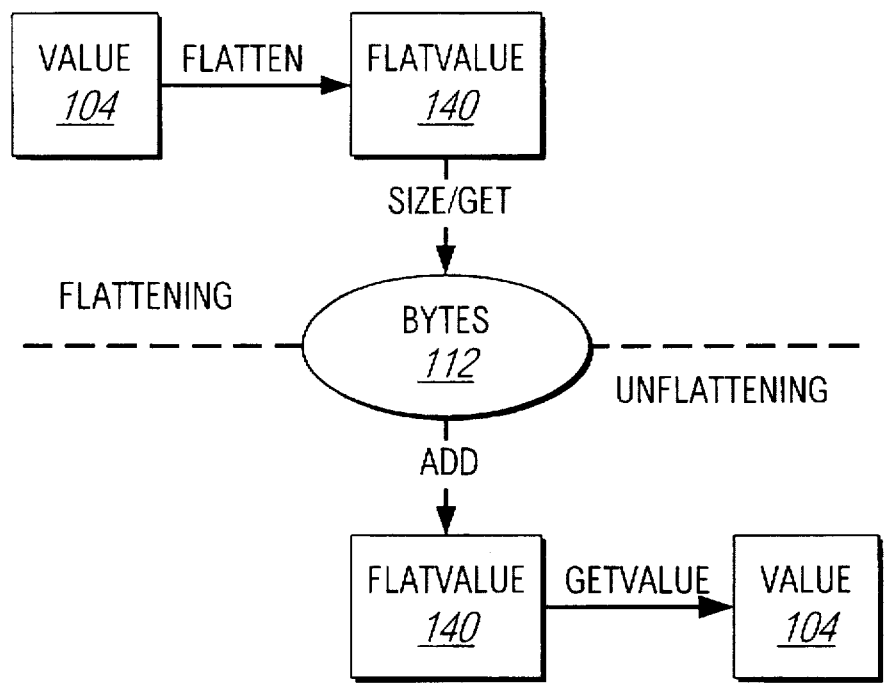
FIG. 6 is an illustration of data flow in a preferred embodiment of a process for flattening and unflattening a value object.

Referring to FIG. 6, the Flatten method makes a copy of the value and returns a flat value object 140, which holds the raw bytes of the original value object 104, and is capable of outputting those bytes as the data stream 112 from which the value object 104 can be reconstructed.

Once a flat value object 140 is constructed by the a call to the flatten method of a value object 104, a call to the Size method of the flat value object 140 returns the number of bytes in the flattened value. A Get method call on the flat value object 140, which takes an offset and a count, returns a byte array containing the appropriate bytes of all of the flattened data elements 124 in the value object 104. For example:

```
Dim v As New WValue
Dim bytes() As Byte
Dim flattener As FlatValue
v.Setstring "{a:1, b:[1,2,3], c:'fred'}"
Set flattener = v.Flatten
bytes = flattener.Get(0, flattener.Size)
```

From the bytes, a copy of the original value object 104 can be reconstructed:

```
Dim v2 As WValue
Dim flattener2 As New FlatValue
flattener2.Add bytes
Set v2 = flattener2.GetValue
Debug.Print v2.GetString
  → {a:1, b:[1,2,3], c:"fred"}
```

Here "v2" is the new value object 104, corresponding logically for example, to value object 104b in FIG. 1. The hierarchical arrangement of the data elements 124 in this second value object 104 is identical to that of the original value object 104, as shown in the final output line.

Notice that no marshalling calls are required in this code example. Thus, the applications programmer is able to easily transmit value objects 104 between computer systems.

Get
result=value.Get [path]

Returns the value found by following the specified path.

If the value can be represented directly in Visual Basic, then a Visual Basic value of the appropriate type is returned:

```
Dim v As New WValue
v.SetString "{Bob: 'Redmond', Greg: ['San Jose', 'Mountain View']}"
Dim s As String
s = v.Get("Bob")
Debug.Print s
  → Redmond
```

However, if the value specified by the path is an aggregate then Get will return a Value object and you must use Visual Basic's Set syntax if you are performing assignment:

```
Dim v2 As WValue
Set v2 = v.Get("Greg")
Debug.Print v2.GetString
  -> ["San Jose", "Mountain View"]
```

If a value holds a primitive type, such as a string or a number, the Get method without any arguments will retrieve the value:

```
v.Set "some string"
Debug.Print v.Get
  -> some string
```

GetClass
string=value.GetClass [path]

Returns the class symbol for an array, map or binary. If the value does not have a class, NULL is returned.

EXAMPLE

```
Dim v As New WValue
v.SetBinary "---some contents---", "Dreedle"
Debug.Print v.GetClass
  -> Dreedle
v.SetClass "Gronk"
Debug.Print v.GetClass
  -> Gronk
```

GetElem
result=value.GetElem [path,] index

Returns the value of the index'th entry in a map.

EXAMPLE

```
Dim v As New WValue
v.SetString "{a:1, b:[1,2,3], c: 'Fred'}"
Dim elems As New WValue
elems.SetArray
For i = 0 To v.Length - 1
    elems.AddLast v.GetElem(i)
Next i
Debug.Print elems.GetString
-> [1, [1, 2, 3], "Fred"]
```

GetKey result=value.GetKey [path,] index

Returns the key of the index'th entry in a map.

EXAMPLE

```
Dim v As New WValue
v.SetString "{a:1, b:[1,2,3], c: 'Fred'}"
Dim keys As New WValue
keys.SetArray
For i = 0 To v.Length - 1
    keys.AddLast v.GetKey(i)
Next i
Debug.Print keys.GetString
-> ["a", "b", "c"]
```

GetString string=value.GetString [path]

Returns a printable representation of the value at the specified path, as a string. The string returned can be used for several purposes, such as a debugging aid. Alternatively, the string may be fed back into a value object, reconstituting the original value, with the SetString method. This is one of the means by which persistent values may be implemented.

EXAMPLE

```
Dim v1 As New WValue
v1.SetMap
v1!a = 42
v1!b = "Fred"
Debug.Print v1.GetString
-> {a: 42, b: "Fred"}
Dim v2 As New WValue
v2.SetString v1.GetString
Debug.Print v1.Equals(v2)
-> True
```

GetType typeNumber=value.GetType [path]

Returns an integer indicating the type code 120 of the data element 124 specified by the path. The type code 120 is preferrably the memory representation type 120. However in to provide compatiblity with the Visual Basic programming environment which uses a set of small integers to define the available types, the following type codes are returned:

TABLE 19

| Type | Type Code |
|---|---|
| nil | 0 |
| Boolean | 0 |
| Character | 2 |
| Unicode Character | 1 |

TABLE 19-continued

| Type | Type Code |
|---|---|
| Integer | 2 |
| Long | 3 |
| Float | 4 |
| Double | 5 |
| Date | 7 |
| String | 8 |
| Unicode String | 8 |
| Binary | 8 |
| Symbol | 8 |
| Array | 9 |
| Sorted Array | 9 |
| Set | 9 |
| Map | 9 |
| OLE Object Reference | 9 |

Note that Table 19 includes a variety of other types of data elements, such as symbol, sorted array, and integer, which as all specifies of the more general types of data elements 124 described above. The OLE object reference type is a data element that holds a reference to an OLE object. Again the type codes here are merely to correspond with Visual Basic types.

EXAMPLE

```
Dim v As New WValue
v.SetString "[42 98.6 'string' [array] {map:0}]"
Dim i As Long
For i = 0 To v.Length - 1
    Debug.Print v.GetString(i), v.GetType(i)
Next i
-> 42        3
   98.6      5
   "string"  8
   [array]   9
   {map: 0}  9
```

GetVBString string=value.GetVBString [path]

Returns a string representation of the value specified by the path. The string's characters are encoded in such a manner that it can be written to a file with a print statement, and read back in with an input statement.

EXAMPLE

This example first writes a value to a file using Visual Basic's GetVBString, then re-opens the file, reads from it, and uses SetVBString to reconstitute the value.

```
Dim v As New WValue
v.SetString "{a:1, b:[1,2,3], c: 'Fred'}"
Dim fn As Integer
fn = FreeFile
Open "Prefs.dat" For Output As #fn
Print #fn, """" + v.GetVBString + """"
Close #fn
v.SetNil
Dim s As String
fn = FreeFile
Open "Prefs.dat" For Input As fn
Input #fn, s
v.SetVBString s
Close #fn
Debug.Print v.GetString
-> {a: 1, b: [1, 2, 3], c: "Fred"}
```

Hash longHash=value.Hash [path]

Returns a 32-bit hash of the value specified by the path.

EXAMPLE

```
Dim v As New WValue
v.Set "a string"
Debug.Print v.Hash
-> 128682615
v.Set "a different string"
Debug.Print v.Hash
-> 44739351
```

Insert value.Insert [path,] index, count

If the value specified by the path is an array, this method inserts count nil values at the index. If the value specified by the path is a string or Unicode string, then count characters whose value is zero are inserted at the index. If the value specified by the path is a binary, then count bytes of zero are inserted at the index. No other value types can be modified with Insert.

EXAMPLE

```
Dim v As New WValue
v.SetString "[a b c d e f]"
v.Insert 0, 1
v.Insert 2, 3
Debug.Print v.GetString
-> [nil, a, nil, nil, nil, b, c, d, e, f]
v.SetBinary "A binary object", "class"
v.Insert 0, 5
Debug.Print v.GetString
-> [binary:class "\x00\x00\x00\x00\x00A binary object"]
```

InsertValue value.InsertValue [path,] index, value2

If the path refers to an array, the value argument (value2) is inserted before the index'th element. If the index is equal to the length of the array, the value is appended to the array.

Example 1

```
Dim v As New WValue
v.Set "Some string"
v.InsertValue 5, "silly"
Debug.Print v.GetString
-> "Some silly string"
v.SetString "[a b c d]"
v.InsertValue 1, "a string"
Debug.Print v.GetString
-> [a, "a string", b, c, d]
v.InsertValue 2, v
Debug.Print v.GetString
-> [a, "a string", [a, "a string", nil, b, c, d], b, c, d]
```

If the path refers to a string or Unicode string, the value argument (value2) should be another string. That string is inserted before the index'th character.

Example 2

```
Dim v As New WValue
v.Set "Some string"
v.InsertValue 5, "silly"
Debug.Print v.GetString
-> "Some silly string"
```

If the path refers to a binary object, the value argument can be a Visual Basic byte array, a string, or another binary object. The bytes from the value argument are inserted before the specified index.

EXAMPLE

```
Dim v As New WValue
v.SetBinary "---some contents---", "Dreedle"
Debug.Print v.GetString
-> [binary: Dreedle "---some contents---"]
Dim b() As Byte
ReDim b(5)
For i = 0 To 5
    b(i) = 64 + i
Next i
v.InsertValue 0, b
v.InsertValue v.Length, "the end"
Debug.Print v.GetString
-> [binary: Dreedle "@ABCDE---some contents---the end"]
```

IsAggregate boolean=value.IsAggregate [path]

This method returns true if the value specified by the path is an array, sorted array, set or map.

EXAMPLE

```
Dim v As New WValue
v.SetArray
Debug.Print v.IsAggregate
-> True
v.Set "Fred"
Debug.Print v.IsAggregate
-> False
``` boolean=value.IsXxxxx [path]

These methods return true if the value specified by the path exists and is of the appropriate type.

EXAMPLE

```
Dim v As New WValue
v.SetString "{a: 1, b: [1,2,3], 99: 'a string', 100: 98.6 }"
Debug.Print v.IsNumber("a")
-> True
Debug.Print v.IsString("a")
-> False
Debug.Print v.IsArray("b")
-> True
Debug.Print v. IsNumber("b", 0)
-> True
Debug.Print v.IsString(99)
-> True
Debug.Print v.IsNumber(100), v.IsDouble(100)
-> True    True
```

IsNumber boolean=value.IsNumber [path]

This method returns true if the value specified by the path is any number (e.g. integer, long, float, or double).

EXAMPLE

```
Dim v As New WValue
v.Set 42
Debug.Print v.IsNumber
-> True
v.Set "Fred"
Debug.Print v.IsNumber
-> False
```

Length
length=value.Length [path]
 This method returns:
  The number of elements in an array, sorted array or set.
  The number of elements in a map.
  The number of characters in a string, Unicode string or symbol.
  The number of bytes in a binary.

EXAMPLE

```
Dim v As New WValue
v.SetArray
v.AddLast 1
v.AddLast 2
v.Insert 0, 55
Debug.Print v.Length
-> 57
v.Set "This is a string"
Debug.Print v.Length
-> 16
```

NewArray
arrayValue=factoryValue.NewArray ([size [, initialValue]])

This is a factory method that creates a new array. If a size is present, the new array will have the specified number of elements, initialized to nil. If an initial value is present, the array elements are initialized to that value. The original value (used as the factory) is not affected.

EXAMPLE

```
Dim factory As New WValue, vArray As WValue
Set vArray = factory.NewArray
Debug.Print vArray.GetString
-> []
Set vArray = factory.NewArray(4)
Debug.Print vArray.GetString
-> [nil, nil, nil, nil]
Set vArray = factory.NewArray(4, "Fred")
Debug.Print vArray.GetString
-> ["Fred", "Fred", "Fred", "Fred"]
```

NewBinary
binaryValue=factoryValue.NewBinary (contents, class)

EXAMPLE

```
Dim factory As New WValue, v As WValue
Set v = factory.NewBinary("contents", "class")
Debug.Print v.GetString
-> [binary: class "contents"]
``` valueobject=factoryValue.NewXxxxx (initialValue )

These factory methods use an existing value object to create another value object of a specific type, with an initial value. The existing value object is not affected.

Example 1

```
Dim factory As New WValue
Dim v As WValue
Set v = factory.NewLong(42)
Debug.Print v.GetString
-> 42
Set v = factory.NewString("This is a string")
Debug.Print v.GetString
-> "This is a string"
```

Example 2

One use of the factory methods is to declare a global, gv, like this:
 Global gV As New WValue
Then a factory method is called on gV any time a new value object 104 is desired:

```
Set onlineUsers = gV.NewArray
Set onlineServices = gV.NewArray
Set sharedInfo = gV.NewMap
```

NewMap
mapValue=factoryValue.NewMap

This method uses an existing value object to create a new, empty map value object 104.

EXAMPLE

```
Dim factory As New WValue
Dim v As WValue
Set v = factory.NewMap
v.Set "a", 42
Debug.Print v.GetString
-> {a: 42}
```

NewSet
setValue=factoryValue.NewSet

This method uses an existing value object 104 to create a new, empty set.

EXAMPLE

```
Dim factory As New WValue
Dim v As WValue
Set v = factory.NewSet
v.Add "a"
v.Add "a"
v.Add "b"
Debug.Print v.GetString
-> [__sortedset: "a", "b"]
```

NewSorted
sortedValue=factoryValue.New Sorted

This method uses an existing value object 104 to create a new, empty sorted array.

EXAMPLE

```
Dim factory As New WValue
Dim v As WValue
Set v = factory.NewSorted
v.Add "a"
v.Add "a"
```

-continued

```
v.Add "b"
Debug.Print v.GetString
-> [_sorted: "a", "a", "b"]
```

NewValue value=factoryValue.Newvalue (string)

This factory method uses an existing value object 104 to create a new one from a string. The string is the print-representation of a value (e.g. as produced by GetString).

EXAMPLE

```
Dim factory As New WValue
Dim v As WValue
Set v = factory.NewValue("{a:1, b:[1,2,3], c:""Fred""}")
Debug.Print v.GetString
-> {a: 1, b: [1, 2, 3], c: "Fred"}
```

Op "ArrayToMap"

Set value2=value.Op("ArrayToMap"[, path])

This Op method requires that the path specify an array. The array is used to construct a new map; each array element is used as the key of a map entry. The value of each map entry is set to nil.

EXAMPLE

```
Dim vArray As New WValue
vArray.SetString "[Fred Joe 100 42 'a string']"
Dim v As New WValue
Set v = vArray.Op("ArrayToMap")
Debug.Print v.GetString
-> {Fred: nil, Joe: nil, 100: nil, 42: nil, la stringl: nil}
```

Op "GetPat"Op "GetNotPat"

Set mapValue=value.Op("GetPat", [, path,] pattern)

Set mapValue=value.Op("GetNotPat", [, path,] pattern)

These Op methods require that the path specify map. The pattern is a string. A new map is constructed, whose entries are copies the map entries whose keys start with (or that do not start with) the specified pattern.

EXAMPLE

```
Dim vMap As New WValue
vMap.SetString "{a_able: 1, a_baker: 2, b_zaphod:3, b_goop:4, x:5}"
Dim v As WValue
Set v = vMap.Op("GetPat", "a_")
Debug.Print v.Getstring
-> {a_able: 1, a_baker: 2}
Set v = vMap.Op("GetPat", "b_")
Debug.Print v.GetString
-> {b_zaphod: 3, b_goop: 4}
```

Op "GetPID"

longvalue=value.Op("GetPID")

This Op method returns the process ID of the Value object in question. By comparing this to the result of GetPID on a Value object known to be created by the current process, this can be used to determine if another Value object was created in process.

EXAMPLE

```
Dim v As New WValue
Debug.Print v.Op("CetPID")
-> 93
```

Op "MapToArray"

Set arrayValue=value.Op("MapToArray"[, path])

This Op method requires that the path specify a map. An array is returned that consists of the keys of all of the map's entries.

EXAMPLE

```
Dim vMap As New WValue
vMap.SetString "{a:1, b:[1,2,3], c:'foo'}"
Dim v As WValue
Set v = vMap.Op("MapToArray")
Debug.Print v.GetString
-> [a,b,c]
```

Op "MD5"

string=value.Op("MD5"[, path])

This Op method computes the MD5 hash (a one-way secure hash) of the Value object in question. It returns a 32-character string of hexadecimal numbers that is the hash. All elements of the value object are taken into consideration; even a slight change to one element of, for example, a map or an array will result in a completely different hash value.

EXAMPLE

```
Dim v As New WValue
v.SetString "{a:1, b:[1,2,3], c:'fred'}"
Debug.Print v.Op("MD5")
-> cd12fc419e838208727d508447da7a1c
v!a = 2
Debug.Print v.Op("MD5")
-> 3820a22a5e5c804533a67539e6ea6e79
```

Op "Merge"

value.Op("Merge"[, path,] mapValue)

This Op method is used to merge maps. The path must refer to a map, which will be the destination of the merge. The mapValue argument must be a map; its map entries are copied into the destination map.

If a map entry exists in both maps, the map entry in the destination is overwritten.

EXAMPLE

```
Dim vMap As New WValue
Dim v As New WValue
vMap.SetString "{a:1, b:2}"
v.SetString "{alpha: bravo, delta: tango}"
v.Op "Merge", vMap
Debug.Print v.GetString
-> {alpha: bravo, delta: tango, a: 1, b: 2}
```

Op "RegGet"

value.Op "RegGet", [path,] rootHandle, registryPath, registryValueName

This Op method replaces the value's current value by reading the string contained in a registry entry. The registry entry is assumed to contain a printed value. The rootHandle is the longword of an open registry entry, or one of the well-known registry handles such as HKEY_LOCAL_

MACHINE. The registryPath is the path to the registry entry in question. The registryValueName is the name of a value within the registry entry to get. If the registry entry does not exist, the value becomes nil.

EXAMPLE

```
Const HKEY_LOCAL_MACHINE = &H80000002
Dim v As New Wvalue
v.SetString "{a: 42, b:[1,2,3], c: 'fred'}"
v.Op "RegSet", HKFY_LOCAL_MACHINE, "Software\Xyzzy",
    "valueName"
v.SetNil
v.Op "RegGet", HKEY_LOCAL_MACHINE, "Software\Xyzzy",
    "valueName"
Debug.Print v.GetString
-> {a: 42, b: [1, 2, 3], c: "fred"}
```

Op "RegGetString"
value.Op "RegGetString", [path,] rootHandle, registryPath, registryValueName This Op method replaces the value's current value with the string contained in a registry entry. The roothandle is the longword of an open registry entry, or one of the well-known registry handles such as HKEY_LOCAL_MACHINE. The registryPath is the path to the registry entry in question. The registryValueName is the name of a value within the registry entry to get.

EXAMPLE

```
Const HKEY_LOCAL_MACHINE = &H80000002
Dim v As New Wvalue
v.Set "This is a string."
v.Op "RegSetString", HKEY_LOCAL_MACHINE,
    "Software\Xyzzy",
    "valueName"
v.SetNil
v.Op "RegGetString", HKEY_LOCAL_MACHINE,
    "Software\Xyzzy",
    "valueName"
Debug.Print v.GetString
-> "This is a string."
```

Op "RegSet"
value.Op "RegSet", [path,] rootHandle, registryPath, registryValueName This Op method prints (writes the string representation) of the value referred to by the path to the specified registry entry. If the value is nil, the registry entry is removed. The rootHandle is the longword of an open registry entry, or one of the well-known registry handles such as HKEY_LOCAL_MACHINE. The registryPath is the path to the registry entry in question. The registryValueName is the name of a value within the registry entry to get.

EXAMPLE

```
Const HKEY_LOCAL_MACHINE = &H80000002
Dim v As New Wvalue
v.SetString "{a:42, b:[1,2,3], c: 'fred'}"
v.Op "RegSet", HKEY_LOCAL_MACHINE, "Software\Xyzzy",
    "valueName"
```

Op "RegSetString"
value.Op "RegSetString", [path,] rootHandle, registryPath, registry ValueName The path must refer to a value object 104 that is a string. This Op method writes the string referred to by the path to the specified registry entry. The rootHandle is the longword of an open registry entry, or one of the well-known registry handles such as HKEY_LOCAL_MACHINE. The registryPath is the path to the registry entry in question. The registryValueName is the name of a value within the registry entry to get.

EXAMPLE

```
Const HKEY_LOCAL_MACHINE = &H80000002
Dim v As New Wvalue
v.Set "This is a string."
v.Op "RegSetString", HKEY_LOCAL_MACHINE, "Software\Xyzzy",
    f "valueName"
```

Op "SortBy"
value.Op "SortBy", [path,] sortOrder

The value specified by the path should be an array of arrays. These inner arrays are rearranged in the outer array in a specified sorting order. For example, assume a set of arrays describing people, account balances:

```
[    ["Allen", "Appleseed", 100.45],
     ["Xavier", "Zarko", -38.61],
     ["Monty", "Mumfred", 4.32]
```

The arrays may be sorted by the person's last name by specifying that the second field be sorted on before any others:

```
Dim v As New WValue
v.SetArray
v.SetString 0, "['Allen', 'Appleseed', 100.45]"
v.SetString 1, "['Xavier', 'Zarkot', -38.61]"
v.SetString 2, "['Monty', 'Mumfred', 4.32]"
v.Op "SortBy", v.NewValue("[1]")
Debug.Print v.pp
-> [["Allen", "Appleseed", 100.45],
    ["Monty", "Mumfred", 4.32],
    ["Xavier", "Zarko", -38.61]
    ]
```

The sortOrder parameter controls how the inner arrays are sorted. It is an array whose elements indicate the order in which to consider elements of the sub-arrays. In this case, the sort order:

... NewValue("[1]")

is used, indicating that the second field be the primary sort key. (The factory method NewValue is used to create a temporary sort order array).

Likewise, the account balance may be sorted:

```
v.Op "SortBy", v.NewValue("[2]")
Debug.Print v.pp
-> [["Xavier", "Zarko", -38.61],
    ["Monty", "Mumfred", 4.32],
    ["Allen", "Appleseed", 100.45]
    ]
```

By following a sort key with the string 'r', the sort is performed in reverse order:

```
v.Op "SortBy", v.NewValue("[2 'r']")
Debug.Print v.pp
-> [["Allen", "Appleseed", 100.45],
```

```
["Monty", "Mumfred", 4.32],
["Xavier", "Zarko", -38.61],
]
```

Op "StripPat"
Op "StripNotPat"
value.Op "StripPat", [path,] pattern
value.Op "StripNotPat", [path,] pattern This method expects the value to be a map. The pattern is a string. All map elements whose keys start with (or that do not start with) the specified pattern are removed from the map.

EXAMPLE

```
Dim v As New WValue, v2 As WValue
v.SetString "{a:1, aa:2, b:1, bb:2}"
Set v2 = v.Clone
v2.Op "StripPat", "a"
Debug.Print v2.GetString
→ {b:1,bb:2}
Set v2 = v.Clone
v2.Op "StripNotPat", "a"
Debug.Print v2.GetString
→ {a:1, aa:2}
```

Op"ToLower"
value.Op "ToLower", [path]

The value referenced by the path must be a string. The contents of the string is converted to lowercase.

Example 1

```
Dim v As New WValue
v.Set "CAPTAIN DREEDLE"
v.Op "ToLower"
Debug.Print v.Get
→ captain dreedle
```

Example 2

```
Dim v As New WValue
v.SetString "['OBSESSED AVENGER', 'SUPERPIIIG!',
              'MEGA COW']"
v.Op "ToLower", 0
v.Op "ToLower", 1
v.Op "ToLower", 2Debug.Print v.Get
→ ["obsessed avenger", "superpiiig!", "mega cow"]
```

Remove
value.Remove [path,] item

If the path specifies an array, the item must be an array index. The item'th array element is removed. If the path specifies a sorted array or a set, the first value that matches the item's value is removed. If the path specifies a map, item is the key of an element to remove.

EXAMPLE

```
Dim v As New WValue
v.SetString "[a b c d]"
v.Remove 1
Debug.Print v.GetString
→ [a,c,d]
```

```
v.SetSet
v.Add "a"
v.Add "b"
v.Add "c"
v.Add "d"
Debug.Print v.GetString
→ [_sortedset: "a", "b", "c", "d"]
v.Remove "c"
Debug.Print v.GetString
→ [_sortedset: "a", "b", "d"]
```

RemoveAll value.RemoveAll [path]

The path must refer to an aggregate. All elements of the aggregate are removed.

EXAMPLE

```
Dim v As New WValue
v.SetMap
v!alpha = 0
v!ralpha = 1
v!boulevard = 2
Debug.Print v.GetString
-> {alpha: 0, ralpha: 1, boulevard: 2} v.RemoveAll
Debug.Print v.GetString
-> {}
```

RemoveFirst result=value.RemoveFirst [path]

The path must refer to an array, sorted array or set. The first element of the array is removed and returned.

EXAMPLE

```
Dim v as New WValue
v.SetString "[a b c d]"
Debug.Print v.RemoveFirst
-> a
Debug.Print v.GetString
-> [b, c, d]
```

RemoveLast result=value.RemoveLast [path]

The path must refer to an array, sorted array or set. The last element of the array is removed and returned.

EXAMPLE

```
Dim v as New WValue
v.SetString "[a b c d]"
Debug.Print v.RemoveLast
-> d
Debug.Print v.GetString
-> [a, b, c]
```

RemoveValue value.RemoveValue [path,] valueToRemove

The path must refer to an aggregate. The first element or map entry with the value of valueToRemove is deleted.

EXAMPLE

```
Dim v As New WValue
v.SetString "[alpha, beta, gamma, wonk, 30, 40, 50, gronk]"
Debug.Print v.GetString
-> [alpha, beta, gamma, wonk, 30, 40, 50, gronk]

v.RemoveValue 40
v.RemoveValue "gamma"
Debug.Print v.GetString
-> [alpha, beta, wonk, 30, 50, gronk]

v.SetMap
v!a = "Brooklyn"
v!b = "Sandusky"
v!c = "Blithering Heights"
Debug.Print v.GetString
-> {a: "Brooklyn", b: "Sandusky", c: "Blithering Heights"} v.RemoveValue "Sandusky"
Debug.Print v.GetString
-> {a: "Brooklyn", c: "Blithering Heights"}
```

Set value.Set [path,] newValue

As described above, the data elements of a value object 104 dynamically altered after the value object 104 has been instantiated and give values in its data elements 124. This dynamic alternation is provided by the Set methods. The value specified by the path is set to the new value. If the path refers to an array element or map entry that does not exist, the array is grown as necessary, or a map element is created.

EXAMPLE

```
Dim v As New WValue
v.SetArray
v.Set 0, "Fred"
v.Set 1, "John"
v.Set 2, "Cecil"
Debug.Print v.GetString
-> ["Fred", "John", "Cecil"]

v.SetMap
v.Set "Fred", 1
v.Set "John", 2
v.Set "Cecil", 3
Debug.Print v.GetString
-> {Fred: 1, John: 2, Cecil: 3} v.Set "A string"
Debug.Print v.GetString
-> "A string"

v.Set 42
Debug.Print v.Get
-> 42
```

Figure 7:
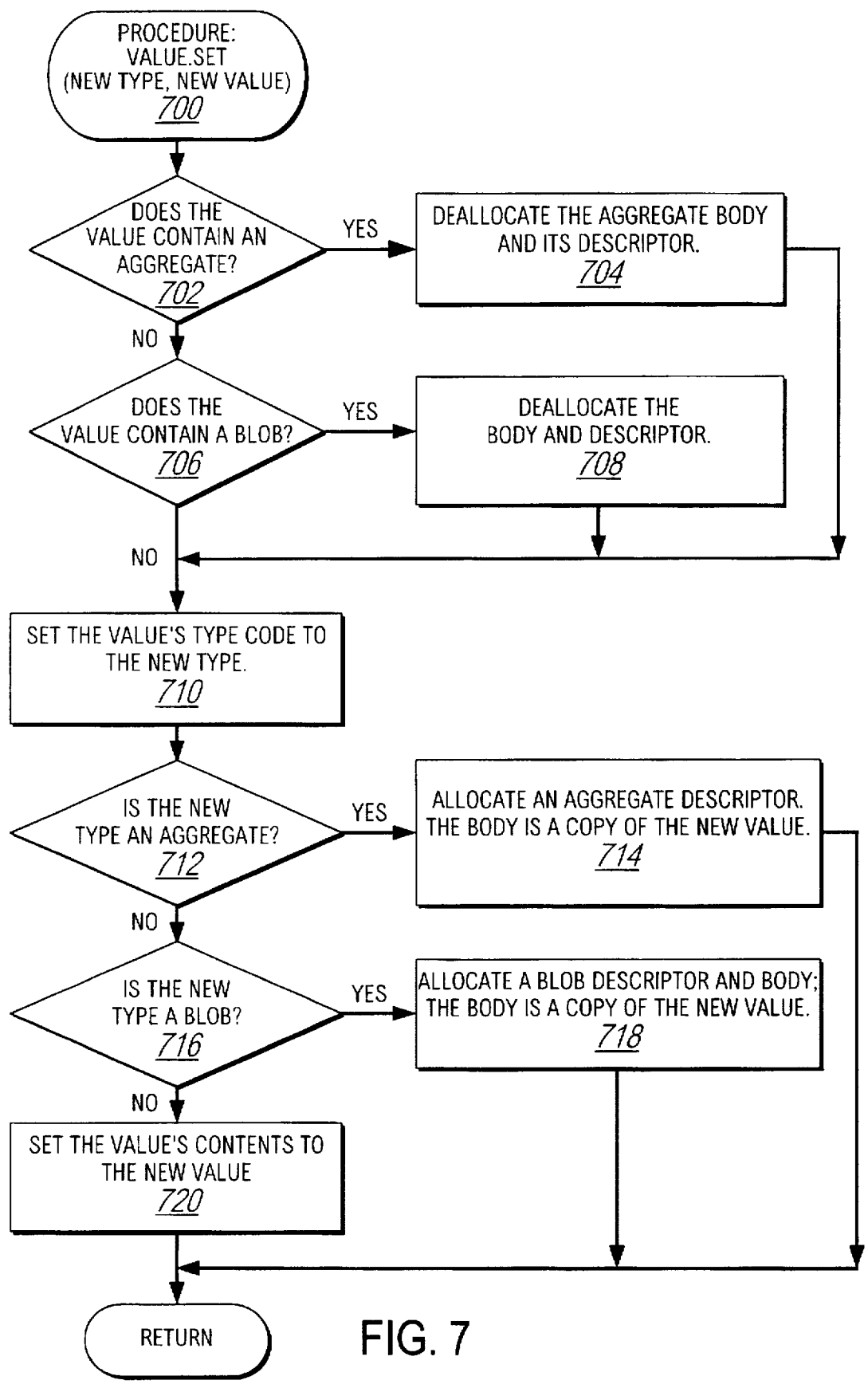
FIG. 7 is a flowchart for dynamically altering the type of a data element.

FIG. 7 illustrates a flowchart for basic implementation of a set method. The method is called 700 on a particular value, or data element in a value object 104, as specified by a path expression. The method takes a new type code 120, and new value for the data element. The method determines 702 whether the data element 124 is an aggregate type. If so, the data member 120, including the descriptor 130 is deallocated 704. If not, the method tests 706 whether the value is a blob type. Again, the data member and descriptor is deallocated 708 if necessary. In either of these cases, the method then sets 710 the type code 120 to the new type code 120. If the type code is an aggregate (712), then an aggregate descriptor 130 is allocated, and the descriptor of the new value is copied 714 to the body of the new descriptor 130. If the new type is blob type (716), then a blob descriptor 130 is allocated, and the descriptor 130 of the data value is copied 718. In either case, the actual data values are set 720 to the values in the new data value that have been passed to the method.

SetArray value.SetArray [ [path,] size]

This causes the value referenced by the path to become an array of the specified size. The array's element's initial values are nil. If the path is empty, the Value object receiving this method becomes an empty array.

```
Dim v As New WValue
v.SetArray
Debug.Print v.GetString
-> []
```

An array of a particular size can be created by specifying the size:

```
v.SetArray 5
Debug.Print v.GetString
-> [nil, nil, nil, nil, nil]
```

Likewise, using a path, a sub-array can be created as one of the outer array's elements:

```
v.SetArray 5
v.SetArray 2, 3
Debug.Print v.GetString
-> [nil, nil, [nil, nil, nil], nil, nil]
```

SetBinary value.SetBinary [path,] contents, classSymbol

This method causes the value specified by the path to become a binary. The initial contents may be a Visual Basic string, or a byte array. The class symbol is a string, or a value object that is a symbol or nil.

EXAMPLE

```
Dim v As New WValue
v.SetBinary "---some contents---", "Dreedle"
Debug.Print v.GetString
-> [binary: Dreedle "---some contents---"]
v.SetMap
v.SetBinary "someKey", "---some contents---", "Dreedle"
Debug.Print v.GetString
-> {someKey: [binary: Dreedle "---some contents---"]}
```

SetClass value.SetClass [path,] symbol

This method allows you to set the class symbol of an array, map or binary. The class symbols of sorted arrays and sets cannot be changed.

EXAMPLE

```
Dim v As New WValue
v.SetArray
v.SetClass "someClass"
Debug.Print v.GetString
-> [someClass:]
v.SetMap
v.SetClass "anotherClass".
Debug.Print v.GetString
```

```
→ {# anotherClass}
v.SetBinary " - - - contents - - - ", "class"
v.SetClass "yetAnotherClass"
Debug.Print v.GetString
→ [binary: yetAnotherClass " - - - contents - - - "]
```

SetGMT value.SetGMT [path,] date

This method allows the applications programmer to set a time value that has a specific GMT time, rather than a local time. Normally, the Set method converts any date value to GMT internally. This method permits the programmer to bypass this conversion. The corresponding method, AsGMT, allows the programmer to access a time value as GMT directly.

EXAMPLE

```
Dim v As New WValue
Debug.Print Now
→ 12/7/95 6:39:48 PM
v.SetGMT Now
Debug.Print v.Get
→ 12/7/95 10:39:48 AM
Debug.Print v.AsGMT
→ 12/7/95 6:39:48 PM
```

SetLength value.SetLength [path,] length

This method is used to set the length of a resizable value. The path must refer to an array, sorted array, set, string, Unicode string or binary. If the new length is smaller than the old length, values at the end of the array, sorted array or set are simply released. If the new length is larger than the old length:

for arrays, nils are added at the end of the array.

for strings, Unicode strings and binaries, zeros are added to the end of the value.

sets and sorted arrays cannot be grown.

EXAMPLE

```
Dim v As New WValue
v.SetArray
v(0) = 0
v(1) = 1
v.SetLength 5
Debug.Print v.GetString
→ [0,1,nil,nil,nil]
v.Set "The Pelagic Argosy sights the land."
v.SetLength 18
Debug.Print v.Get
→ The Pelagic Argosy
```

SetMap value.SetMap [path]

The value specified by the path is turned into an empty map. The previous contents of the value object 104 are lost.

EXAMPLE

```
Dim v As New WValue
v.SetMap
v!a = 42
v!b = v.NewValue("[1,2,3]")
```

```
v!c = "Fred"
Debug.Print v.pp
→ {a:42,
  b:[1,2,3],
  c:"Fred"}
```

SetNil value.SetNil [path]

The value specified by the path is set to nil. The previous contents of the value object 104 are lost.

EXAMPLE

```
Dim v As New WValue
v.SetString "{a:42, b:[1,2,3], c:'Fred'}"
Debug.Print v.GetString
→ {a: 42, b:[1,2,3], c: "Fred"}
v.SetNil "b"
Debug.Print v.GetString
→ {a:42, b:nil, c:"Fred"}
v.SetNil
Debug.Print v.GetString
→ nil
```

SetSet value.SetSet [path]

The value specified by the path is turned into an empty set. The previous contents of the value object 104 are lost.

EXAMPLE

```
Dim v As New WValue
v.SetSet
v.Add "alpha"
v.Add "Alpha"
v.Add "beta"
Debug.Print v.GetString
→ [_sortedset "alpha", "beta"]
```

SetSorted value.SetSorted [path]

The value specified by the path is turned into an empty sorted array. The previous contents of the value object 104 are lost.

EXAMPLE

```
Dim v As New WValue
v.SetSorted
v.Add "alpha"
v.Add "Alpha"
v.Add "beta"
Debug.Print v.GetString
→ [_sorted: "Alpha", "alpha", "beta"]
```

SetString value.SetString [path,] string

This method sets the value specified by the path to the string's interpreted value. Using the SetString method is an easy way to initialize values.

EXAMPLE

```
Dim v As New WValue
v.SetString "[a sample array]"
```

```
Debug.Print v.GetString
 → [a, sample, array]
v.SetString {_a:1, b:[1,2,3], c:'Fred', d:{x:1000, y:2000}}"
Debug.Print v.pp
 → {a:1,
     b:[1,2,3],
     c:"Fred",
     d:{x:1000,
        y:2000}}
```

SetSymbol
value.SetSymbol [path,] string

The value specified by the path is set to a symbol. The string argument should a string.

EXAMPLE

```
Dim v As New WValue
v.SetSymbol "Froggy"
Debug.Print v.GetString
 → Froggy
v.SetString "[an array of symbols]"
Debug.Print v.GetString
 → [an,array,of,symbols]
Debug.Print v.IsSymbol(0), v.IsSymbol(1), v.IsSymbol(2)
 → True       True       True
```

SetUnicodeChar
value.SetUnicodeChar [path,] number

The value specified by the path is set to a Unicode character.

EXAMPLE

```
Dim v As New WValue v.SetUnicodeChar 12334
Debug.Print v.GetString
-> $\u302e v.SetArray 3
v.SetUnicodeChar 1, 12334
Debug.Print v.GetString
-> [nil, $\u302e, nil]
```

SetUnicodeString
value.SetUnicodeString [path,] string

The value specified by the path is set to a Unicode string.

EXAMPLE

```
Dim v As New Wvalue v.SetUnicodeString "A unicode string"
Debug.Print v.GetString
-> #"A\x00 \x00u\x00n\x00i\x00c\x00o\x00d\x00e\x00
\x00s\x00t\x00r\x00i\x00n\x00g\x00"
```

SetVBString
value.SetVBString [path,] string

This method is used in conjunction with the result of the strings returned by the method GetVBString. The SetVBString method accepts a string formatted from a value by GetVBString and reconstitutes the value. The only difference between the methods GetString/SetString and GetVBString/SetVBString is that the latter set of methods escape characters (such as quotation marks) in a manner that is friendly to Visual Basic's Input# statement.

EXAMPLE

```
Dim v As New WValue
v.SetString "{a: 1, b: [1, 2, 3], c: 'Fred'}"

Dim s As String
s = v.GetVBString
Debug.Print s
-> {a: 1, b: [1, 2, 3], c: 'qFred'q}

Dim v2 As New WValue
v2.SetVBString s
Debug.Print v2.GetString
-> {a: 1, b: [1, 2, 3], c: "Fred"}
```

Sort
value.Sort path

The path must refer to an array. The elements of the array are sorted in ascending order. If the array contains values of different types (e.g., strings mixed with numbers), then numbers are sorted before strings. If the array contains any sub-arrays, the sub-arrays are ordered in the outer array in increasing order according to the elements that the sub-arrays contain.

EXAMPLE

```
Dim v As New WValue
v.SetString "[99 -1 42 100 -4]"
v.Sort
Debug.Print v.GetString
-> [-4, -1, 42, 99, 100]

v.SetString "[Xavier Fred John Allan Queeqog]"
v.Sort
Debug.Print v.GetString
-> [Allan, Fred, John, Queeqog, Xavier]

v.SetArray
v.SetString 0, "[Xavier 450]"
v.SetString 1, "[Fred 45]"
v.SetString 2, "[Fred -1]"
v.SetString 3, "[Allan 35]"
v.Sort
Debug.Print v.GetString
-> [[Allan, 35], [Fred, -1], [Fred, 45], [Xavier, 450]]
```

Version
string=value.Version

This method returns a string indicating a version level of the value object 104, as set by the provider of the application programming environment containing the value object 104 class.

EXAMPLE

```
Dim v As New WValue
Debug.Print v.Version
-> 2.0
```

In summary, the present invention provides a simple but powerful tool for working with data structures. A value object can contain a rich variety of data types and data elements, including text, tables, numbers, binary objects, arrays, maps, sets and the like. Value objects provide a single, convenient representation for data that works well as a local general-purpose data structure, and that is also easily transported from one computer to another, without the need to use conventional marshalling routines. Value objects support a rich set of data types that allows information to be expressed simply and naturally.

When value objects are transmitted or stored, their representation is relatively compact. The semantic structure of the value object is preserved between its memory representation in a computer memory and its transmission representation in a transmission medium. Value objects are self-describing, making it easy to design message formats that are flexible and extensible. There is no inherent need for message format "version numbers," as in conventional messaging systems. Value objects can easily be made persistent by storing them in database tables or text files. This makes store-and-forward services particularly easy to design and implement.

We claim:

1. A computer readable memory having a plurality of contiguous storage locations and storing an object including:
   at least one data element each data element comprising:
   a) in at least one first storage location a type code defining a type of a data for the data element, the type being one of a group comprising:
      a first type of data element having a fixed length, the first type of data associated with first type code;
      a second type of data element having a variable length but not including other data elements, the second type of data associated with a second type code; and,
      a third type of data element having a variable length and capable of including other data elements, the third type of data associated with a third type code; and,
   b) in at least one second storage location contiguous with the at least one first storage location, a data member selected from a group comprising:
      at least one data value of the data element; or,
      at least one reference to another data element.

2. The computer readable memory of claim 1, wherein the type code for at least one type of data element is determined according to a frequency distribution of the types of selected data elements in a sample of data.

3. The computer readable memory of claim 1, wherein, the type code for at least one type of data element is the data value of the data element when the data value is within a specified range of data values.

4. The computer readable memory of claim 1, wherein:
   the data member is determined according to the selected type code, and being one of a group comprising:
      a fixed number of storage locations where the type code is the first type code;
      a length value specifying a number of units in the data member, and the number of units, each unit having a fixed number of storage locations, where the type code is the second type code; and,
      a length value specifying a number of units in the data member, and the number of units, each unit being a data element of any of the types of the data elements, where the type code is the third type code.

5. The computer readable memory of claim 1, wherein the data member is selected from a group further comprising:
   a reference to a descriptor including a length field, and a number of contiguous storage locations holding data values, the number being specified in the length field.

6. The computer readable memory of claim 1, wherein the data member is selected from a group further comprising:
   a reference to a descriptor including a length field, and a number of contiguous sets of storage locations, each set of storage locations including a key value, and a data element, the number of sets being specified in the length field, such that any data element may be retrieved according to its key value.

7. A computer readable memory having a plurality of contiguous storage locations and storing an object including:
   at least one data element, each data element comprising:
   a) in at least one first storage location a type code defining a type of a data for the data element, the type being one of a group comprising:
      a first type of data element having a fixed length, the first type of data associated with a first type code;
      a second type of data element having a variable length but not including other data elements, the second type of data associated with a second type code; and,
      third type of data element having a variable length and capable of including other data elements, the third type of data associated with a third type code; and,
   b) in at least one second storage location contiguous with the at least one first storage location, a data member selected from a group comprising:
      at least one data value of the data element; or,
      at least one reference to another data element; and
   a plurality of instructions for controlling a computer to convert the object from a memory representation using memory dependent locations to a transmission representation using memory independent data bytes.

8. The computer readable memory of claim 7, wherein the plurality of instructions reads the object from the memory, and recursively descends through each data element including a reference to another data element, and converts each such reference from a data element to a contiguous sequence of data bytes for the type code and data member of the data element, the contiguous sequence of data bytes adapted for transmission to a second computer readable memory.

9. A computer readable memory having a plurality of contiguous storage locations and storing an object including:
   at least one data element, each data element comprising:
   a) in at least one first storage location a type code defining a type of a data for the data element; and,
   b) in at least one second storage location contiguous with the at least one first storage location, a data member selected from a group comprising:
      at least one data value of the data element; or
      at least one reference to another data element; and
   a first procedure to retrieve any selected data element within the object;
   a second procedure to remove any selected data element within the object;
   a third procedure to add a new data element at a designated location within the object;
   at least one fourth procedure to determine whether a selected data element within the object is of a selected type;
   at least one fifth procedure to change the type code for any selected data element within the object to a selected type code; and
   at least one sixth procedure to replace the data member for any selected data element within the object with an input data member.

10. A computer readable arrangement of data in a transmission medium, the arrangement of data having a plurality of contiguous memory independent data bytes that form an object including:
    at least one data element, each data element comprising:
    a) in at least one first data byte a type code defining a type of data for the data element, the type code selected from a group comprising:

a first type code for a first type of data element having a fixed length;

a second type code for a second type of data element having a variable length but not including other data elements; and, a third type code for a third type of data element having a variable length and capable of including other data elements;

b) in a plurality of second data bytes contiguous with the at least one first data byte, a data member determined according to the selected type code, and being one of a group comprising:

a fixed number of data bytes where the type code is the first type code;

a length value specifying a number of units in the data member, and the number of units, each unit having a fixed number of data bytes, where the type code is the second type code; and, a length value specifying a number of units in the data member, and the number of units, each unit being a data element of any of the types of the data elements, where the type code is the third type code.

11. A computer readable memory coupled to a transmission medium to receive a computer readable arrangement of data, the computer readable memory including a plurality of instructions to read the data and create in memory an object by storing in contiguous storage locations:

data bytes of a first type code;

data bytes of data members for data elements of a first type corresponding to the first type code;

data bytes of a second type code and a reference to data members for data elements of a second type corresponding to the second type code; and data bytes of a third type code; and a reference to data members for data elements of a third type corresponding to the third type code.

12. A computer implemented method of transferring data between a first and second computer, comprising:

storing in a memory of the first computer an object including:

at least one data element, each data element comprising:

a) in at least one first storage location a type code defining a type of a data for the data element; and, b) in at least one second storage location contiguous with the at least one first storage location, a data member selected from a group comprising:

at least one data value of the data element; or at least one reference to another data element;

flattening the object to produce a memory location independent byte stream representation of the object;

transferring the byte stream representation from the first computer to a memory of the second computer; and, reconstructing in the memory of the second computer the object from the byte stream representation.

13. A computer system, comprising:

a network providing a transmission medium;

a first computer having a first computer memory having a plurality of contiguous storage locations and storing a first object having a first structure comprising:

at least one data element, each data element comprising:

a) in at least one first storage location a type code defining a type of a data for the data element, the type selected from a group comprising:

a first type of data element having a fixed length, the first type of data associated with a first type code;

a second type of data element having a variable length but not including other data elements, the second type of data associated with a second type code; and, a third type of data element having a variable length and capable of including other data elements, the third type of data associated with a third type code; and b) in at least one second storage location contiguous with the at least one first storage location, a data member selected from a group comprising:

at least one data value of the data element; or, at least one reference to another data element;

wherein the first computer is communicatively coupled to the network, and converts the object from the first structure to a computer readable arrangement of data comprising:

at least one data element, each data element comprising:

a) in at least one first data byte a type code defining a type of a data for the data element, the type code selected from a group comprising:

a first type code for a first type of data element having a fixed length;

a second type code for a second type of data element having a variable length but not including other data elements; and, a third type code for a third type of data element having a variable length and capable of including other data elements;

b) in a plurality of second data bytes contiguous with the at least one first data byte, a data member determined according to the selected type code, and being one of a group comprising:

a fixed number of data bytes where the type code is the first type code;

a length value specifying a number of units in the data member, and the number of units, each unit having a fixed number of data bytes, where the type code is the second type code; and, a length value specifying a number of units in the data member, and the number of units, each unit being a data element of any of the types of the data elements, where the type code is the third type code; and a second computer having a second computer memory, and communicatively coupled to the network to receive the computer readable data arrangement, and to convert it to a second object semantically identical to the first object, and having the first structure.

* * * * *